United States Patent
Mehta et al.

(10) Patent No.: US 11,924,734 B2
(45) Date of Patent: Mar. 5, 2024

(54) WIRELESS SIGNAL STRENGTH-BASED DETECTION OF POOR NETWORK LINK PERFORMANCE

(71) Applicant: Juniper Networks, Inc., Sunnyvale, CA (US)

(72) Inventors: Ruchit Rajkumar Mehta, Emeryville, CA (US); Kaushik Adesh Agrawal, Chelmsford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 37 days.

(21) Appl. No.: 17/644,764

(22) Filed: Dec. 16, 2021

(65) Prior Publication Data
US 2023/0112613 A1  Apr. 13, 2023

Related U.S. Application Data

(60) Provisional application No. 63/262,242, filed on Oct. 7, 2021.

(51) Int. Cl.
*H04L 41/0631* (2022.01)
*H04L 12/46* (2006.01)
*H04W 24/08* (2009.01)
*H04W 40/12* (2009.01)

(52) U.S. Cl.
CPC ......... *H04W 40/12* (2013.01); *H04L 12/4633* (2013.01); *H04L 41/0631* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 9,503,958 B2 | 11/2016 | Nishioka | |
| 9,729,439 B2 | 8/2017 | MeLampy et al. | |
| 9,729,682 B2 | 8/2017 | Kumar et al. | |
| 9,736,046 B1 * | 8/2017 | Jain | H04L 43/08 |
| 9,762,485 B2 | 9/2017 | Kaplan et al. | |
| 9,871,748 B2 | 1/2018 | Gosselin et al. | |

(Continued)

FOREIGN PATENT DOCUMENTS

CN  102724086 B  5/2018

OTHER PUBLICATIONS

Extended Search Report from counterpart European Application No. 22200328.7 dated Feb. 21, 2023, 10 pp.

(Continued)

*Primary Examiner* — Benjamin Lamont
(74) *Attorney, Agent, or Firm* — Shumaker & Sieffert, P.A.

(57) ABSTRACT

A cloud-based network management system (NMS) stores path data from network devices operating as network gateways for an enterprise network, the path data collected by each network device of the plurality of network devices. The NMS determines, for a logical path within a specified time window, a wireless signal quality and a link quality based at least in part on the path data. The NMS, in response to determining that the logical path is of a poor link quality, determine a correlation between a poor wireless quality and the poor link quality. The NMS may output a notification that indicates the correlation between the poor wireless quality and the poor link quality of the logical path.

18 Claims, 14 Drawing Sheets

(56) References Cited

U.S. PATENT DOCUMENTS

| | | |
|---|---|---|
| 9,985,883 B2 | 5/2018 | MeLampy et al. |
| 10,200,264 B2 | 2/2019 | Menon et al. |
| 10,277,506 B2 | 4/2019 | Timmons et al. |
| 10,432,522 B2 | 10/2019 | Kaplan et al. |
| 10,756,983 B2 | 8/2020 | Ratkovic et al. |
| 10,992,543 B1 | 4/2021 | Rachamadugu et al. |
| 11,121,954 B2 | 9/2021 | Vasseur et al. |
| 11,165,863 B1 | 11/2021 | Timmons et al. |
| 2013/0040683 A1* | 2/2013 | Siomina ............... H04W 24/08 455/517 |
| 2016/0218963 A1* | 7/2016 | Nauck .................. H04L 45/302 |
| 2017/0235623 A1* | 8/2017 | Brew .................... H04L 41/065 714/37 |
| 2018/0302308 A1* | 10/2018 | O'Brien ................ H04L 43/16 |
| 2020/0136890 A1* | 4/2020 | To ......................... H04L 41/064 |
| 2020/0213236 A1* | 7/2020 | Safavi ..................... G06N 3/044 |
| 2020/0267047 A1* | 8/2020 | Safavi ................. H04L 41/0631 |
| 2020/0366589 A1 | 11/2020 | Kaplan et al. |
| 2020/0366590 A1 | 11/2020 | Kaplan et al. |
| 2020/0366598 A1 | 11/2020 | Kaplan et al. |
| 2020/0366599 A1 | 11/2020 | Kaplan et al. |
| 2020/0403890 A1 | 12/2020 | McCulley et al. |
| 2022/0052905 A1* | 2/2022 | Vasseur .................. H04L 41/14 |
| 2023/0009634 A1* | 1/2023 | Garcarz ................. H04L 45/02 |
| 2023/0027754 A1* | 1/2023 | Kolar .................. H04L 41/0631 |

OTHER PUBLICATIONS

Shao et al., "Accessing Cloud with Disaggregated Software-Defined Router", Proceedings of the 18th USENIX Symposium on Networked Systems Design and Implementation, USENIX, Apr. 12, 2021, 15 pp., URL: https://www.usenix.org/system/files/nsdi21-shao.pdf.

Response to Extended Search Report dated Feb. 21, 2023, from counterpart European Application No. 22200328.7 filed Oct. 10, 2023, 30 pp.

* cited by examiner

WIRELESS SIGNAL STRENGTH-BASED DETECTION OF POOR NETWORK LINK PERFORMANCE This application claims the benefit of U.S. Provisional Patent Application No. 63/262,242, filed Oct. 7, 2021, the entire contents of which is incorporated herein by reference.

TECHNICAL FIELD

This disclosure generally relates to computer networks and, more specifically, monitoring and/or managing network performance in computer networks.

BACKGROUND

A computer network is a collection of interconnected computing devices that can exchange data and share resources. Example computing devices include routers, switches, and other layer two (L2) network devices that operate within layer two of the Open Systems Interconnection (OSI) reference model, i.e., the data link layer, and layer three (L3) network devices that operate within layer three of the OSI reference model, i.e., the network layer. Network devices within computer networks often include a control unit that provides control plane functionality for the network device and forwarding components for routing or switching data units.

SUMMARY

In general, this disclosure describes techniques for monitoring network performance and managing network faults to identify potential root causes of poor link quality within a wide area network (WAN). A cloud-based network management system (NMS) receives the path data from the network devices. The path data is indicative of one or more aspects of network performance as monitored on each logical path between network devices over a WAN, e.g., a broadband network, a wireless network such as a Long Term Evolution (LTE) network, or Multi-protocol Label Switching (MPLS) network.

According to the disclosed techniques, a physical interface of a network device may, in some examples, be a wireless physical interface that establishes wireless links (e.g., wireless paths) with other network devices. For example, a logical path from such a wireless physical interface may be a wireless logical path, such as a LTE path or another wireless cellular path, between the wireless physical interface to another network devices. When the NMS determines that the link quality of such a wireless logical path is poor, the NMS may determine whether the poor link quality of the wireless logical path correlates with the wireless logical path experiencing poor wireless signal quality. If the NMS determines that the poor link quality of the wireless logical path correlates with the wireless logical path experiencing poor wireless signal quality, the NMS may determine that the poor wireless signal quality experienced by the NMS is a potential root cause for the poor link quality of the wireless logical path.

The techniques of the disclosure provide one or more technical advantages and practical applications. The techniques enable the cloud-based NMS to automatically monitor and quantify the link quality of a wireless WAN link (e.g., a wireless physical interface and/or a wireless logical path) based on received path data from network devices over time, and to correlate the link quality of the WAN link with the wireless signal quality of the WAN link over time. Correlating the link quality of the WAN link with the wireless signal quality enables the NMS to identify whether poor link quality of the WAN link is caused by poor wireless signal quality, thereby enabling users, such as network administrators, to more quickly identify and ameliorate the root cause of such poor link quality of the WAN link.

In one aspect, a network management system includes a memory storing path data received from a plurality of network devices operating as network gateways for an enterprise network, the path data collected by each network device of the plurality of network devices for one or more logical paths of a physical interface from the given network device over a wide area network (WAN); and one or more processors coupled to the memory and configured to: determine, based at least in part on the path data, a wireless signal quality of a logical path within a specified time window and a link quality of the logical path within the specified time window; in response to determining that the logical path is of a poor link quality during the specified time window, determine a correlation between a poor wireless quality of the logical path during the specified time window and the poor link quality of the logical path; and in response to determining the correlation between the poor wireless quality of the logical path during the specified time window and the poor link quality of the logical path, output a notification that identifies the correlation between the poor wireless quality of the logical path and the poor link quality of the logical path.

In another aspect, a method includes determining, by one or more processors of a network management system and based at least in part on path data received from a plurality of network devices operating as network gateways for an enterprise network, the path data collected by each network device of the plurality of network devices for one or more logical paths of a physical interface from the given network device over a wide area network (WAN), a wireless signal quality of a logical path within a specified time window and a link quality of the logical path within the specified time window; in response to determining that the logical path is of a poor link quality during the specified time window, determining, by the one or more processors, a correlation between a poor wireless quality of the logical path during the specified time window and the poor link quality of the logical path; and in response to determining the correlation between the poor wireless quality of the logical path during the specified time window and the poor link quality of the logical path, output a notification that identifies the correlation between the poor wireless quality of the logical path and the poor link quality of the logical path.

In another example, a computer-readable storage medium comprising instructions that, when executed, cause one or more processors of a network management system to: determine, based at least in part on path data received from a plurality of network devices operating as network gateways for an enterprise network, the path data collected by each network device of the plurality of network devices for one or more logical paths of a physical interface from the given network device over a wide area network (WAN), a wireless signal quality of a logical path within a specified time window and a link quality of the logical path within the specified time window; in response to determining that the logical path is of a poor link quality during the specified time window, determine a correlation between a poor wireless quality of the logical path during the specified time window and the poor link quality of the logical path; and in response to determining the correlation between the poor wireless quality of the logical path during the specified time window and the poor link quality of the logical path, output a notification that identifies the correlation between the poor wireless quality of the logical path and the poor link quality of the logical path.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
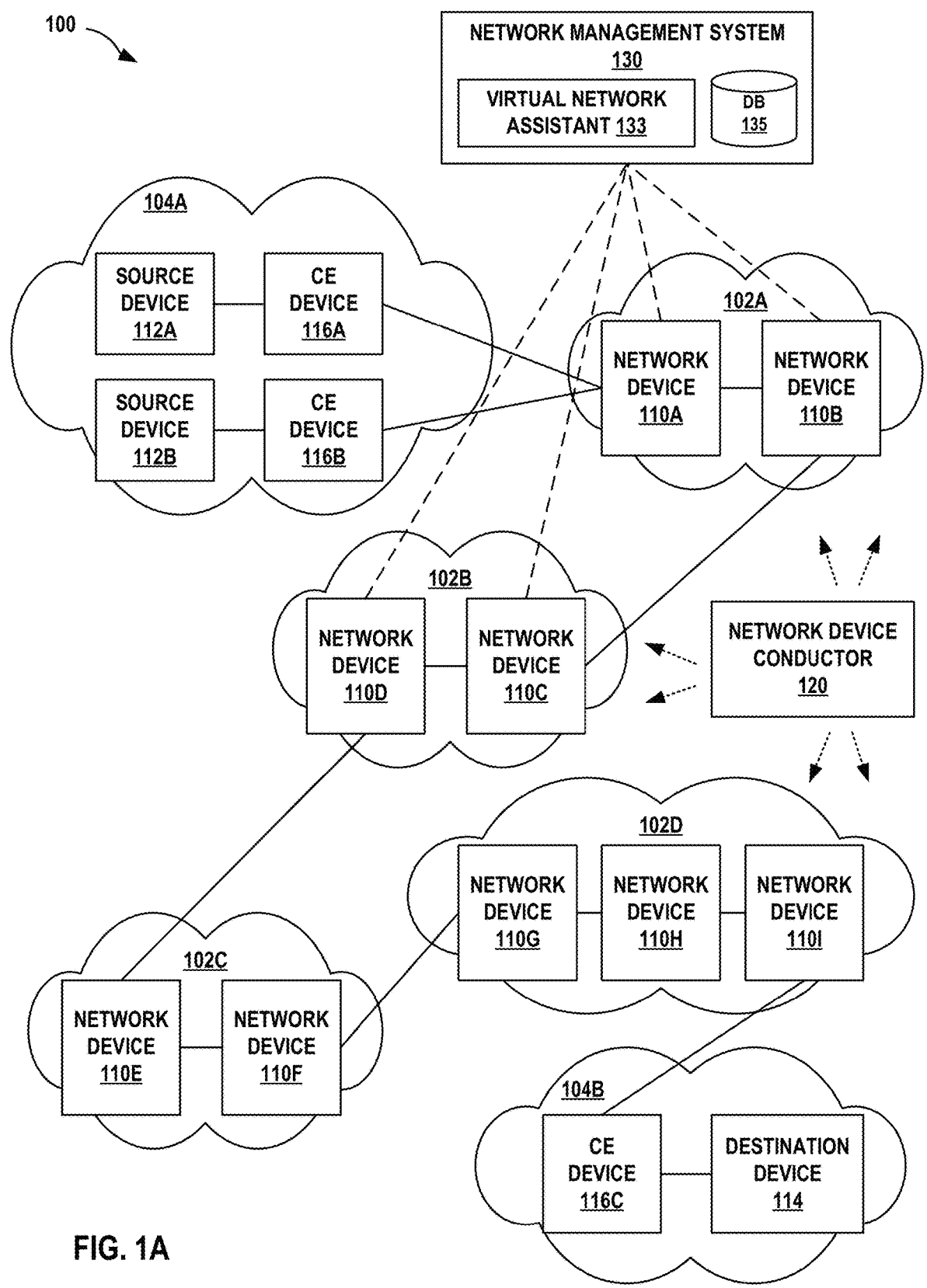
FIGS. 1A-1C are block diagrams illustrating example network systems including a network management system (NMS) is configured to monitor network performance and manage network faults in an enterprise network based on one or more WAN link health assessments, in accordance with one or more techniques of the disclosure.
Figure 1B:
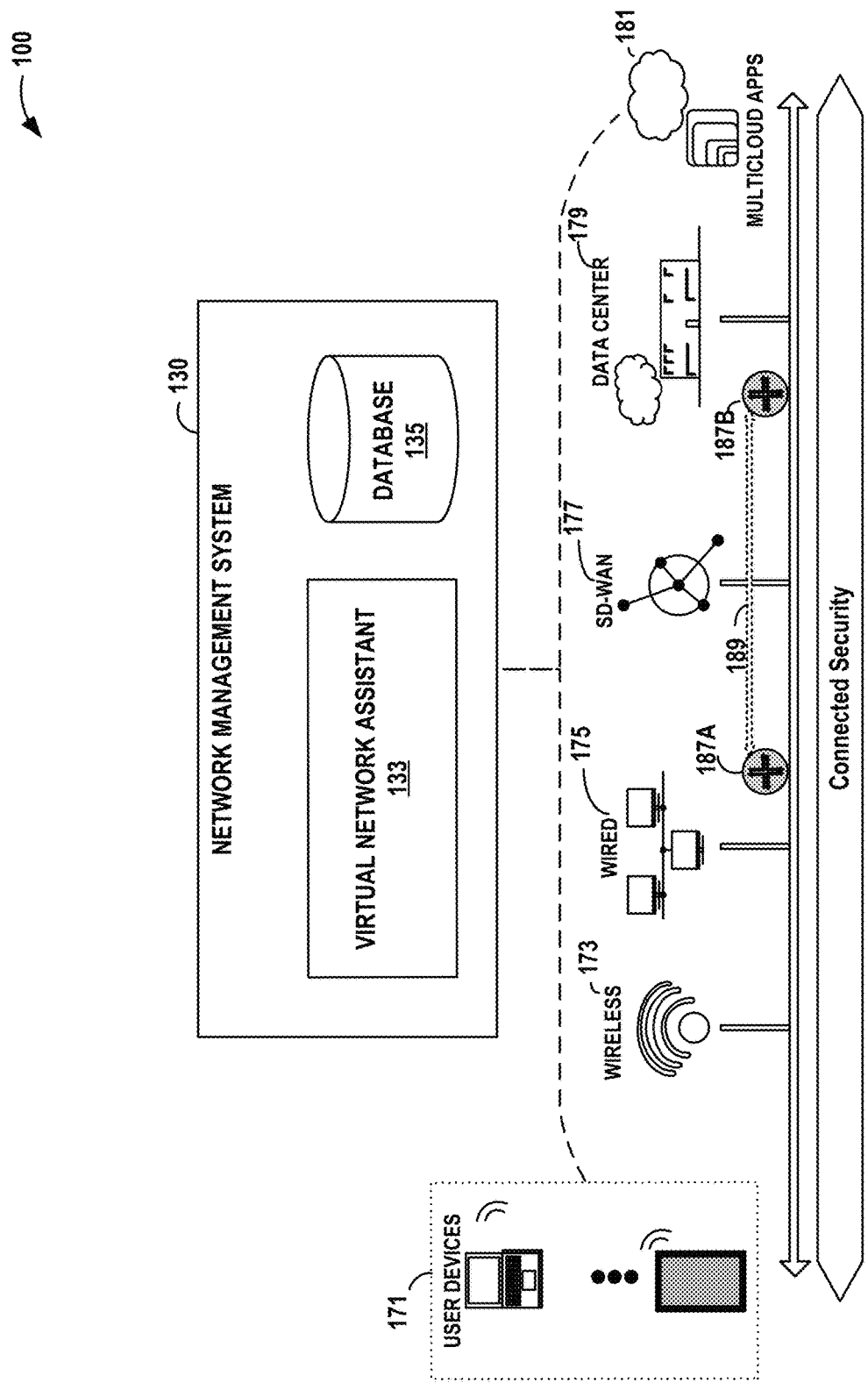
Figure 1C:
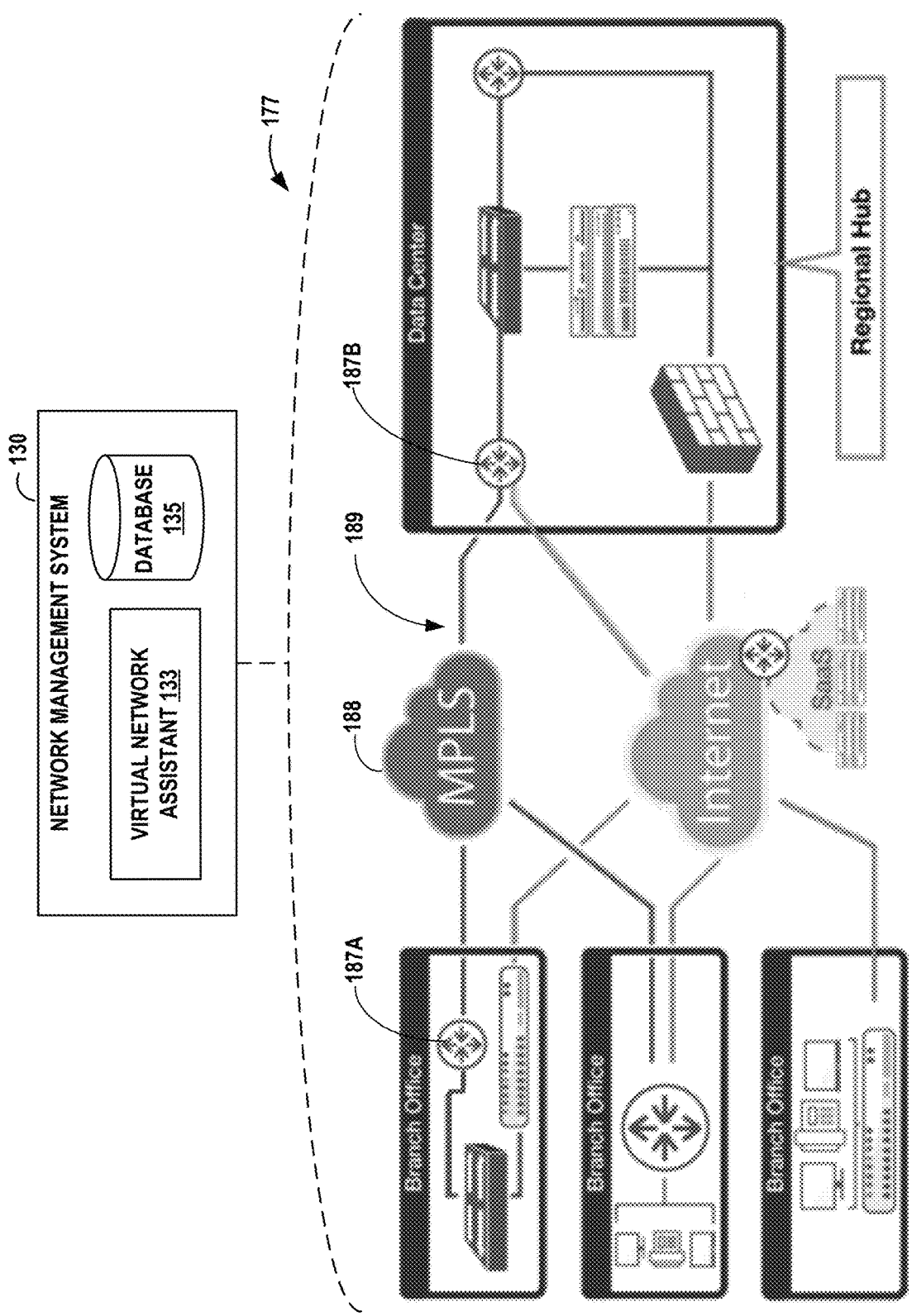

FIGS. 1A-1C are block diagrams illustrating example network systems 100 including a network management system (NMS) 130 is configured to monitor network performance and manage network faults in an enterprise network based on one or more WAN link health assessments, in accordance with one or more techniques of the disclosure.

FIG. 1A is a block diagram illustrating example network system 100 in accordance with the techniques of the disclosure. In the example of FIG. 1A, network system 100 includes networks 102A-102D (collectively, "networks 102") configured to provide Wide Area Network (WAN) connectivity to different customer networks 104A-104B ("customer networks 104") of an enterprise network. In some examples, networks 102 are service provider networks. Although in the example of FIG. 1A, network system 100 is illustrated as including multiple interconnected networks 102, in other examples network system 100 may alternatively include a single network that provides connectivity between customer networks 104.

Network devices 110A-110I (collectively, "network devices 110") of networks 102 provide source devices 112A and 112B (collectively, "source devices 112") and destination device 114 associated with customer networks 104 with access to networks 102 via customer edge devices 116A-116C (collectively, "CE devices 116"). Communication links between network devices 110 may be Ethernet, ATM, or any other suitable network connections.

Network device conductor 120 is a centralized management and policy engine that provides orchestration, administration, and zero-touch provisioning for distributed network devices 110 while maintaining a network-wide, multi-tenant service, and policy data model. Network device conductor 120 may be considered an orchestrator. In some examples, network device conductor 120 also provides monitoring and analytics for network devices 110, while in other examples monitoring and analytics for network devices 110 and/or CE devices 116 are provided by NMS 130 only. In some examples, NMS 130 provides WAN Assurance services to networks 102 and provides Wireless Assurance and/or Wired Assurance services to customer networks 104. In the example of FIG. 1A, NMS 130 includes a virtual network assistant 133 which may provide machine-learning based analytics of data collected by NMS 130 from network devices 110 of networks 102 for the WAN Assurance services, and may provide machine-learning based analytics of data collected by NMS 130 from CE devices 116 or other customer equipment within customer networks 104 for the Wireless Assurance and/or Wired Assurance services.

CE devices 116 and network devices 110 are discussed herein for purposes of example as being routers. However, techniques of the disclosure may be implemented using any network device, such as switches, routers, gateways, or other suitable network devices that may send and receive network traffic. Customer networks 104 may be networks for geographically separated sites of the enterprise network, for example. Each of customer networks 104 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices not depicted in FIG. 1A. The configuration of network system 100 illustrated in FIG. 1A is merely an example. For example, network system 100 may include any number of customer networks 104. Nonetheless, for ease of description, only customer networks 104A-104B are illustrated in FIG. 1A.

Networks 102 represent one or more publicly accessible computer networks that are owned and operated by one or more service providers. A service provider is usually a large telecommunications entity or corporation. Each of networks 102 is usually a large Layer-Three (L3) computer network, where reference to a layer followed by a number refers to a corresponding layer in the Open Systems Interconnection (OSI) model. Each network 102 is an L3 network in the sense that it natively supports L3 operations as described in the OSI model. Common L3 operations include those performed in accordance with L3 protocols, such as the Internet Protocol (IP). L3 is also known as a "network layer" in the OSI model and the term L3 may be used interchangeably with the phrase "network layer" throughout this disclosure. Although not illustrated, each network 102 may be coupled to one or more networks administered by other providers, and may thus form part of a large-scale public network infrastructure, e.g., the Internet. Consequently, customer networks 104 may be viewed as edge networks of the Internet. Each network 102 may provide computing devices within customer networks 104, such as source devices 112 and destination devices 114, with access to the Internet, and may allow the computing devices within customer networks 104 to communicate with each other.

Although additional network devices are not shown for ease of explanation, network system 100 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of network system 100 are illustrated as being directly coupled, one or more additional network elements may be included along any of the communication links between network devices 110, such that the network elements of computer network system 100 are not directly coupled.

Each network 102 typically provides a number of residential and business services for customer networks 104, including residential and business class data services (which are often referred to as "Internet services" in that these data services permit access to the collection of publicly accessible networks referred to as the Internet), residential and business class telephone and/or voice services, and residential and business class television services.

In some examples, network devices 110 comprise packet-based routers that employ a packet- or flow-based routing scheme to forward packets according to defined network paths established by a centralized controller, such as a Software-Defined Networking (SDN) controller, that performs path selection and traffic engineering. A given one of network devices 110, e.g., network device 110A, that comprises a packet-based router operating as a network gateway for customer network 104A may establish multiple tunnels over the WAN with one or more other packet-based routers, e.g., network device 110I, operating as network gateways for other sites of the enterprise network, e.g., customer network 104B. As described herein, each of the packet-based routers may collect data at a tunnel level, and the tunnel data may be retrieved by NMS 130 via an API or an open configuration protocol or the tunnel data may be reported to NMS 130 by a software agent or other module running on the packet-based router.

In other examples, network devices 110 comprise session-based routers that employ a stateful, session-based routing scheme that enables each network device 110 to independently perform path selection and traffic engineering. The use of session-based routing may enable network devices 110 to eschew the use of a centralized controller, such as an SDN controller, to perform path selection and traffic engineering. In this way, network devices 110 may be more efficient and scalable for large networks where the use of an SDN controller would be infeasible. Furthermore, the use of session-based routing may enable network devices 110 to eschew the use of tunnels, thereby saving considerable network resources by obviating the need to perform encapsulation and decapsulation at tunnel endpoints. In some examples, network devices 110 implement session-based routing as Secure Vector Routing (SVR), provided by Juniper Networks, Inc. A given one of network devices 110, e.g., network device 110A, that comprises a session-based router operating as a network gateway for customer network 104A may establish multiple peer paths over the WAN with one or more other session-based routers, e.g., network device 110I, operating as network gateways for other sites of the enterprise network, e.g., customer network 104B. As described herein, each of the session-based routers may include a software agent imbedded in the session-based router configured to report path data collected at a peer path level to NMS 130.

A network session (also referred to herein as a "session") includes a forward packet flow originating from a first device and destinated for a second device and/or a reverse packet flow originating from the second device and destined for the first device. The session may be bidirectional in that the session may include packets travelling in both directions (e.g., a forward packet flow and a reverse packet flow) between the first and second devices.

When, e.g., network device 110A receives a packet for a flow originating from source device 112A and destined for destination device 114, network device 110A determines whether the packet belongs to a new session (e.g., is the "first" packet or "lead" packet of the session). In some examples, network device 110A determines whether a source address, source port, destination address, destination port, and protocol of the first packet matches an entry in a session table. If no such entry exists, network device 110A determines that the packet belongs to a new session and creates an entry in the session table. Furthermore, if the packet belongs to a new session, network device 110A generates a session identifier for the session. The session identifier may comprise, e.g., a source address and source port of source device 112A, a destination address and destination port of destination device 114, and a protocol used by the first packet. Network device 110A may use the session identifier to identify subsequent packets as belonging to the session.

In some examples, network devices 110 perform stateful routing for a session. This means that network devices 110 forward each packet of the forward packet flow of a session sequentially and along the same forward network path. As described herein, the "same" forward path means the same network devices 110 that form a segment or at least a portion between a device originating the packet and a device to which the packet is destined (and not necessarily the entire network path between the device originating the packet and the device to which the packet is destined). Further, network devices 110 forward each packet of the return flow of the session sequentially and along the same return network path. The forward network path for the forward packet flow and the return network path of the return flow may be the same path, or different paths. By ensuring that each packet of a flow is forwarded sequentially and along the same path, network devices 110 maintain the state of the entire flow at each network device 110, thereby enabling the use of stateful packet services, such as Deep Packet Inspection (DPI).

In the example of FIG. 1A, a stateful routing session may be established from ingress network device 110A through intermediate network devices 110B-110H to egress network device 110I. In this example, network device 110A determines that the first packet is an unmodified packet and the first packet of a new session. Network device 110A modifies the first packet to include metadata specifying the session identifier (e.g., the original source address, source port, destination address, and destination port). Network device 110A replaces the header of the modified first packet to specify a source address that is an address of network device 110A, a source port that is a port via which network device 110A forwards the modified first packet toward destination device 114, a destination address that is an address of the next hop to which network device 110A forwards the first packet (e.g., an address of network device 110B), and a destination port that is a port of the next hop to which network device 110A forwards the first packet (e.g., a port of network device 110B).

Network device 110A may further identify a network service associated with the session. For example, network device 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, if the source port and/or destination port for the session is 80, network device may determine that the session is associated with HTTP. In other examples, network device 110A may determine that one or more of a source address, source port, destination address, or destination port for the session belong to a block of address or ports indicative that a particular service is associated with the session.

In some examples, network device 110A uses the determined network service for the session to select a forward path for forwarding the first packet and each subsequent packet toward destination device 114. In this fashion, network device 110A may perform service-specific path selection to select a network path that best suits the requirements of the service. In contrast to a network topology that uses an SDN controller to perform path selection, each network device 110 performs path selection. Further, the use of session-based routing enables each network device 110 to make routing decisions at the service- or application-level, in contrast to conventional network devices that are only able to make routing decisions at the flow level.

Network device 110A forwards the modified first packet to network device 110B. Additionally, network device 110A stores the session identifier for the session such that, upon receiving subsequent packets for the session, network device 110A may identify subsequent packets as belonging to the same session and forward the subsequent packets along the same path as the first packet.

Intermediate network device 110B receives the modified first packet and determines whether the modified first packet includes a portion of metadata specifying the session identifier. In response to determining that the modified first packet includes metadata specifying the session identifier, intermediate network device 110B determines that network device 110B is not an ingress device such that network device 110B does not attach metadata specifying the session identifier.

As described above with respect to network device 110A, network device 110B determines whether the packet belongs to a new session (e.g., is the "first" packet or "lead" packet of the session) by determining whether a source address, source port, destination address, destination port, and protocol of the first packet matches an entry in a session table. If no such entry exists, network device 110B determines that the packet belongs to a new session and creates an entry in the session table. Furthermore, if the packet belongs to a new session, network device 110B generates a session identifier for the session. The session identifier used by network device 110B to identify the session for the first packet may be different from the session identifier used by network device 110A to identify the same session for the first packet, because each network device 110A, 110B uses the header source address, source port, destination address, and destination port of the first packet to generate the session identifier, and this information is modified by each preceding network device 110 as each network device 110 forwards the first packet along the forward path. Furthermore, each network device 110 may store this header information to identify a previous network device 110 (or "waypoint") and a next network device 110 (or "waypoint") such that each network device 110 may reconstruct the same forward path and reverse path for each subsequent packet of the session.

Network device 110B replaces the header of the modified first packet to specify a source address that is an address of network device 110B, a source port that is a port via which network device 110B forwards the modified first packet toward destination device 114, a destination address that is an address of the next hop to which network device 110B forwards the first packet (e.g., an address of network device 110C), and a destination port that is a port of the next hop to which network device 110B forwards the first packet (e.g., a port of network device 110C). Network device 110B forwards the modified first packet to network device 110C. Additionally, network device 110B stores the session identifier for the session such that, upon receiving subsequent packets for the session, network device 110B may identify subsequent packets as belonging to the same session and forward the subsequent packets along the same path as the first packet.

Subsequent intermediate network devices 110C-110H process the modified first packet in a similar fashion as network devices 110A and 110B such that network devices 110 forward the subsequent packets of the session along the same path as the first packet. Further, each network device 110 stores a session identifier for the session, which may include an identification of the previous network device 110 along the network path. Thus, each network device 110 may use the session identifier to forward packets of the reverse packet flow for the session along the same network path back to source device 112A.

A network device 110 that may forward packets for a forward packet flow of the session to a destination for the packet flow is an egress, or "terminus" network device. In the foregoing example, network device 110I is a terminus network device because network device 110I may forward packets to CE device 116C for forwarding to destination device 114. Network device 110I receives the modified first packet that comprises the metadata specifying the session identifier (e.g., the original source address, source port, destination address, and destination port). Network device 110I identifies the modified first packet as destined for a service terminating at network device 110I by determining that the destination source address and destination source port specified in the metadata of the modified lead packet corresponds to a destination reachable by network device 110I (e.g., destination device 114 via CE device 116C). Network device 110I recovers the original first packet by removing the metadata from the modified first packet and modifying the header of the first packet to specify the original source address, source port, destination address, and destination port. Network device 110I forwards the recovered first packet to CE device 116C for forwarding to destination device 114.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; and U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, to implement session-based routing, each network device 110 maintains a local repository of service and topology state information for each other network device 110. The service and topology state information includes services reachable from each network device 110, as well as a network topology from each network device for reaching these services. Each network device 110 may transmit changes in the services reachable from the network device 110 and/or changes in the network topology for reaching the services from the network device to a central repository, e.g., a server. Further, each network device 110 may receive service and topology state information for each other network device 110 in computer network system 100 from the central repository.

In the foregoing example, network device 110A receives a packet, determines a session for a packet flow comprising the packet, determines a service associated with the session, and selects a network path for forwarding the packet. Network device 110A may use its local copy of the service and topology state information for each network device 110 to select the network path for forwarding the packet. For example, network device 110A may use the identified service associated with the packet and a network topology for reaching the identified service to select a network path that comports with a Service Level Agreement (SLA) requirement or other performance requirements for the service. Network device 110A may then forward the packet and subsequent packets for the flow along the selected path. In this fashion, network device 110A may perform service-specific path selection in that network device 110 may use criteria specific to the service associated with the packet to select a network path that best suits the requirements of the service.

In some examples, interfaces of network devices 110 may be assigned to one or more "neighborhoods." A "neighborhood" is defined as a label applied to an interface of a network device 110. The network devices 110 within the same neighborhood are capable of forming a peering relationship with one another. For example, each network device 110 having an interface to which a neighborhood label is applied is reachable over a Layer-3 network to each other network device 110 having an interface to which the same neighborhood label is applied. In some examples, one or more neighborhoods may be aggregated into a "district." A district is a logical grouping of one or more neighborhoods. Typically, an Autonomous System (AS) (also referred to herein as an "Authority") may be divided into one or more districts, each district including one or more neighborhoods.

In some examples, each network device 110 maintains a local repository of service and topology state information only for those other network devices 110 within the same neighborhood. In some examples, each network device 110 maintains a local repository of service and topology state information only for those other network devices 110 within the same district of neighborhoods. As an example, each service provider network 102 may be considered to be a different "district," wherein each subdomain within each service provider network 102 may be considered to be a neighborhood within that district. In this example, each network device 110A and 110B within service provider network 102A may maintain service and topology state information only for one another, and not for network devices 110C-110I. Similarly, each network device 110D and 110C within service provider network 102B may maintain service and topology state information only for one another, and not for network devices 110A-110B or 110E-110I. In other examples, an administrator may assign one or more service provider networks 102 into one or more districts, one or more neighborhoods, or a combination of districts and neighborhoods as suits the needs of network system 100.

Additional information with respect to the exchange of service and topology state information is described in U.S. Patent Application Publication No. 2020/0366590, entitled "CENTRAL AUTHORITY FOR SERVICE AND TOPOLOGY EXCHANGE," published on Nov. 19, 2020; U.S. Patent Application Publication No. 2020/0366599, entitled "SOURCE-BASED ROUTING," published on Nov. 19, 2020; U.S. Patent Application Publication No. 2020/0366598, entitled "SERVICE AND TOPOLOGY EXCHANGE PROTOCOL," published on Nov. 19, 2020; U.S. Patent Application Publication No. 2020/0366589, entitled "ROUTING USING SEGMENT-BASED METRICS," published on Nov. 19, 2020; and U.S. patent application Ser. No. 16/050,722, entitled "NETWORK NEIGHBORHOODS FOR ESTABLISHING COMMUNICATION RELATIONSHIPS BETWEEN COMMUNICATION INTERFACES IN AN ADMINISTRATIVE DOMAIN," filed on Jul. 31, 2018, the entire content of each of which is incorporated herein by reference in its entirety.

In accordance with the techniques of the disclosure, NMS 130 is configured to monitor network performance and manage network faults that may impact user experiences in an enterprise network (e.g., experiences of source devices 112 and/or destination device 114 in customer networks 104) based on path data received from one or more network devices 110 operating as network gateways for the enterprise network. NMS 130 receives the path data from network devices 110 and stores the path data received over time in database 135. The path data is indicative of one or more aspects of network performance as monitored on each logical path (e.g., peer path or tunnel) between network devices 110 over the WAN, e.g., a broadband network, Long Term Evolution (LTE) network, or Multi-protocol Label Switching (MPLS) network. NMS 130 includes virtual network assistant 133 having a WAN link health Service Level Expectation (SLE) metric engine that determines one or more WAN link health assessments based on the path data received from network devices 110. Based on the WAN link health assessments, NMS 130 may identify success or failure states associated with the WAN link interface and/or path, identify a root cause of the one or more failure states, and/or automatically recommend or invoke one or more remedial actions to address the identified failure states.

A given network device, e.g., network device 110A, may establish multiple logical paths (e.g., peer paths for a session-based router or tunnels for a packet-based router) on a single physical interface over the WAN with multiple other network devices, e.g., network device 110I. One or more of network devices 110A may include a software agent or other module configured to report path data collected at a logical path level to NMS 130. In other examples, the path data may be retrieved from one or more of network devices 110 by NMS 130 via an API or an open configuration protocol. The cloud-based NMS may store the path data received from the network devices over time and, thus, provide a network performance history of the network devices.

According to the disclosed techniques, NMS 130 is configured to determine, for logical paths from network devices 110 that are wireless logical paths, such as logical paths over LTE or another form of wireless communications, whether the link quality of such a wireless logical path correlates to a wireless signal quality of the wireless logical path. That is, NMS 130 is configured to, when NMS 130 determines that the link quality of a wireless logical path is poor, determine whether the poor link quality of the logical path correlates to poor wireless signal quality of the logical path. Further, NMS 130 is configured to determine, for a wireless physical interface, such as an LTE physical interface, of a network device (e.g., one of network devices 110), whether poor wireless signal quality of wireless logical paths connected via the LTE physical interface is a potential root cause of poor link quality of the wireless logical paths to a plurality of clients (e.g., other ones of network devices 110) connected to the network device via the LTE physical interface.

NMS 130 may be configured to determine the link quality of a logical path using bidirectional forwarding detection (BFD) to detect failure in the logical path. Specifically, NMS 130 is configured to use BFD to detect failures in the logical path during a time period, and may determine the link quality of the logical path during the time period based at least in part on the failures detected in the logical path during the time period.

NMS 130 may also be configured to determine the wireless signal quality of a logical path during a time period by monitoring one or more wireless signal parameters of the logical path. The one or more wireless signal parameters may include one or more of: the signal-to-noise ratio, referred to as SNR, SINR, or SNIR, of the logical path, the Reference Signal Received Power (RSRP) of the logical path, the Reference Signal Received Quality (RSRQ) of the logical path, or the Received Signal Strength Indicator (RSSI) of the logical path. NMS 130 may be configured to determine the wireless signal quality of a logical path during a time period based on the one or more wireless signal parameters during the time period, such as by determining the wireless signal strength of the logical path during the time period based on the one or more wireless signal parameters and by determining the wireless signal quality of a logical path during a time period based at least in part on the wireless signal strength of the logical path during the time period.

NMS 130 is configured to determine whether poor link quality of a logical path during a time period correlates to poor wireless signal quality of the logical path during the time period. Determining such a correlation between poor link quality and poor wireless signal quality may enable NMS 130 to determine a potential root cause of the poor link quality of the logical path during the time period. NMS 130 may be configured to, in response to determining that poor link quality of a logical path during a time period correlate to poor wireless signal quality of the logical path during the time period, identify poor wireless signal quality of the logical path during the time period as a potential root cause of the poor link quality and/or identify a correlation between the poor wireless signal quality of the logical path during the time period and the poor link quality during the time period.

Similarly, NMS 130 may be configured to determine, for a wireless physical interface (e.g., LTE interface) of a network device, the link quality of logical paths that connect clients (e.g., other network devices) to the network device via the wireless physical interface using bidirectional forwarding detection (BFD) to detect failure in logical paths of clients connected to the wireless physical interface. Specifically, NMS 130 is configured to use BFD to detect failures in the logical paths during a time period, and may determine the link quality of each of the logical paths during the time period based at least in part on the failures detected in each of the logical path during the time period.

NMS 130 is configured to determine whether poor link quality of the logical paths connected to the wireless physical interface during a time period correlates to poor wireless signal quality of the wireless physical interface during the time period. Determining such a correlation between poor link quality and poor wireless signal quality may enable NMS 130 to determine a potential root cause of the poor link quality of the logical paths during the time period. NMS 130 may be configured to, in response to determining that poor link quality of the logical paths during a time period correlate to poor wireless signal quality of the wireless physical interface during the time period, identify a correlation between the poor wireless signal quality of the wireless physical interface during the time period and the poor link quality of the logical paths connected to the wireless physical interface during the time period.

FIG. 1B is a block diagram illustrating further example details of network system 100 of FIG. 1A. In this example, FIG. 1B illustrates NMS 130 configured to operate according to an artificial intelligence/machine-learning-based computing platform providing comprehensive automation, insight, and assurance (e.g., Wireless Assurance, Wired Assurance and/or WAN Assurance) spanning from a wireless network 173 and wired LAN 175 at the network edge (far left of FIG. 1B) to cloud-based application services 181 hosted by computing resources within data centers 179 (far right of FIG. 1). Referring back to FIG. 1A, user devices 171 may comprise one or more of source devices 112 and destination device 114, and wired LAN 175 hosting wireless network 173 may comprise one or more customer networks 104 of the enterprise network.

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, NMS 130 may be configured to proactively monitor and adaptively configure network system 100 so as to provide self-driving capabilities. Moreover, virtual network assistant 133 includes a natural language processing engine to provide AI-driven support and troubleshooting, anomaly detection, AI-driven location services, and AI-drive RF optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 173 and wired LANs 175 to data centers 179 and application services 181. In general, SD-WAN 177 provides seamless, secure, traffic-engineered connectivity between "spoke" routers 187A of edge wired networks 175 hosting wireless networks 173, such as branch or campus networks (e.g., customer networks 104 from FIG. 1 as sites of an enterprise network), to "hub" routers 187B further up the cloud stack toward cloud-based application services 181. Referring back to FIG. 1A, routers 187A, 187B may comprise network devices 110 operating as network gateways for the enterprise network.

SD-WAN 177 often operates and manages an overlay network on an underlying physical Wide-Area Network (WAN), which provides connectivity to geographically separate customer networks, e.g., customer networks 104 of FIG. 1A. In other words, SD-WAN 177 may extend SDN capabilities and/or session-based routing or SVR capabilities to a WAN that allow networks to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 171 to steer traffic along selected paths, e.g., peer path 189, toward application services 181 without requiring use of tunnels and/or additional labels. In this way, routers 187A, 187B may be more efficient and scalable for large networks since the use of tunnel-less, session-based routing may enable routers 187A, 187B to achieve considerable network resources by obviating the need to perform encapsulation and decapsulation at tunnel endpoints. Moreover, in some examples, each router 187A, 187B may independently perform path selection and traffic engineering to control packet flows associated with each session without requiring use of a centralized SDN controller for path selection and label distribution. In some examples, routers 187A, 187B implement session-based routing as SVR, provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 173, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

In accordance with the techniques described in this disclosure, NMS 130 is configured to monitor network performance and manage network faults that may impact user experiences in the enterprise network based on path data received from one or more network devices operating as network gateways for the enterprise network (e.g., routers 187A, 187B). NMS 130 receives the path data from routers 187A, 187B that is indicative of one or more aspects of network performance as monitored on each logical path 189, e.g., peer path or tunnel, between routers 187A, 187B in SD-WAN 177 over an underlying physical WAN, and stores the path data in database 135 over time.

NMS 130 includes virtual network assistant 133 having a WAN link failure engine that determines, for a logical path from a wireless physical interface, such as an LTE physical interface, whether poor wireless signal quality of the logical path is a potential root cause of poor link quality of the logical path. For example, NMS 130 may monitor the link quality and the wireless signal quality of a wireless logical path over time. When NMS 130 determines that the link quality of the wireless logical path is poor, NMS 130 may determine whether such poor link quality correlates to poor wireless signal quality of the wireless logical path. If NMS 130 determines that the poor link quality correlates to poor wireless signal quality of the wireless logical path, NMS 130 may identify the poor wireless signal quality of the wireless logical path as a potential root cause of the poor link quality. In some examples, virtual network assistant 133 may automatically recommend or invoke one or more remedial actions to address the potential cause of the poor link quality.

FIG. 1C is a block diagram illustrating further example details of network system 100 of FIG. 1B. In particular, FIG. 1C illustrates an example SD-WAN deployment architecture of SD-WAN 177 of FIG. 1B. In the illustrated example, SD-WAN 177 includes a spoke router 187A within a branch office connecting to a hub router 187B in a data center via logical path 189 over the underlying physical WAN, e.g., MPLS network 188. SD-WAN 177 also includes a hosted or Software as a Service (SaaS) applications.

When troubleshooting SD-WAN issues, it may be beneficial to separate the issues into three segments: 1) branch office, 2) logical path (e.g., peer path or tunnel) over WAN, e.g., MPLS, LTE or Broadband network, and 3) application services including both internally hosted applications (e.g., in the data center) and SaaS applications. NMS 130 may be configured to track the temporal connectivity topology of these three segments for each customer deployment and also detect various types of user-impacting issues in virtual network assistant 133. By joining the connectivity topology with the corresponding events happened in each segment, virtual network assistant 133 of NMS 130 may be able to pinpoint the location and root cause of different user-impacting SD-WAN issues. Examples of user-impacting issues for the branch office segment may include device health, bad cable, and configuration issues (e.g., maximum transmission unit (MTU)). Examples of user-impacting issues for the logical path segment may include link connectivity and link performance degradation. Examples of user-impacting issues for the application services segment may include service reachability and service performance.

In accordance with the techniques described in this disclosure, virtual network assistant 133 of NMS 130 has a WAN link failure engine configured to monitor the health condition of the logical paths from the spoke routers, e.g., logical path 189 from router 187A, and detect the network failures and performance degradation that may impact user experiences. The WAN link failure engine uses a measurement unit of a user-path-minute to measure a health state (e.g., success vs failure) for each user of each logical path each minute, which is multiplied by the number of active users passing traffic through each path during that time interval as a user impact measurement. The WAN link failure engine may aggregate path data received from network devices, e.g., routers 187A, 187B, over a selected period of time and at a selected granularity-level (e.g., site-level or network device-level). The WAN link failure engine may determine a success or failure state associated with one or more of service provider reachability, physical interface operation, or logical path performance based on the aggregated path data, and classify the determined failure states. Some examples of failure conditions, i.e., what conditions should be considered as failed user-path-minutes, are as follows: ISP unreachability, network path performance degradation, interface over-subscription, interface errors, and/or weak/unstable interface signal strength.

Several high-level design considerations are described herein. In some examples, the WAN link failure engine is configured to measure the health state for the logical path segment over WAN 188, which can be over broadband, LTE, or MPLS, between spoke router 187A in the branch office and hub router 187B in the data center, but may not measure the health state for the connection from the data center to the application servers or the health state for the application services themselves. In some examples, the WAN link failure engine is configured to measure the health state for the logical path segment from spoke routers, e.g., spoke router 187A in the branch office, but may not measure the health state for hub routers, e.g., hub router 187B in the data center.

The network devices may collect logical path statistics via bidirectional forwarding detection (BFD) probing, which is normally sent via a low-priority traffic class. As such, the logical path statistics may not always be representative of true user experiences at different application levels. For example, it is possible that a certain logical path may have low performance for a best effort traffic class and thus be determined as having bad or failed user-path-minutes, but the low performance for the best effort traffic class may not cause any true user impact since user application sessions are sent via a higher-priority traffic class. In some instances, this may result in a finding of "bad WAN Link Health SLE" but "good Application Health SLE." In addition, the network devices, e.g., session-based routers, may treat all available links (e.g., LTE, Broadband, or MPLS) as active and may monitor the logical path statistics over each link. As such, the WAN link failure engine may detect and report link failures even if there is no user traffic sent over a particular link during a failing interval.

Figure 2:
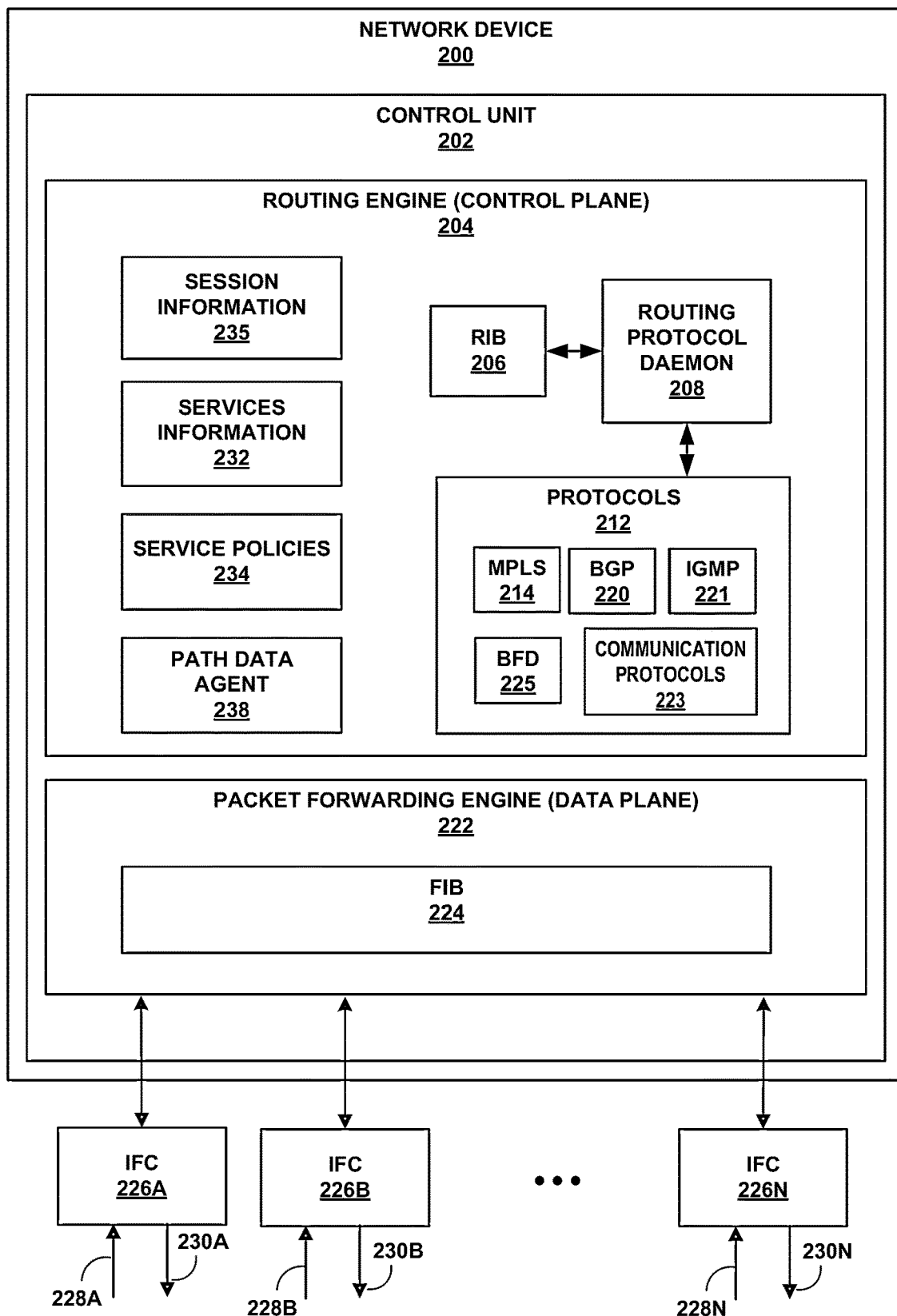
FIG. 2 is a block diagram illustrating an example network device, in accordance with the techniques of the disclosure.

FIG. 2 is a block diagram illustrating an example network device 200 in accordance with the techniques of the disclosure. In general, network device 200 may be an example of one of network devices 110 of FIG. 1A or one of routers 187A, 187B of FIGS. 1B and 1C. In this example, network device 200 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. Network device 200 also includes a control unit 202 that determines routes of received packets and forwards the packets accordingly via IFCs 226.

Control unit 202 may comprise routing engine 204 and packet forwarding engine 222. Routing engine 204 operates as the control plane for network device 200 and includes an operating system that provides a multi-tasking operating environment for execution of a number of concurrent processes. Routing engine 204 communicates with other routers, e.g., such as network devices 110 of FIG. 1A, to establish and maintain a computer network, such as network system 100 of FIGS. 1A-1C, for transporting network traffic between one or more customer devices. Routing protocol daemon (RPD) 208 of routing engine 204 executes software instructions to implement one or more control plane networking protocols 212. For example, protocols 212 may include one or more routing protocols, such as Internet Group Management Protocol (IGMP) 221 and/or Border Gateway Protocol (BGP) 220, for exchanging routing information with other routing devices and for updating routing information base (RIB) 206, Multiprotocol Label Switching (MPLS) protocol 214, and other routing protocols. Protocols 212 may further include one or more communication session protocols 223, such as TCP, UDP, TLS, or ICMP. Protocols 212 may also include one or more performance monitoring protocols, such as BFD 225.

RIB 206 may describe a topology of the computer network in which network device 200 resides, and may also include routes through the shared trees in the computer network. RIB 206 describes various routes within the computer network, and the appropriate next hops for each route, i.e., the neighboring routing devices along each of the routes. Routing engine 204 analyzes information stored in RIB 206 and generates forwarding information for forwarding engine 222, stored in forwarding information base (FIB) 224. FIB 224 may associate, for example, network destinations with specific next hops and corresponding IFCs 226 and physical output ports for output links 230. FIB 224 may be a radix tree programmed into dedicated forwarding chips, a series of tables, a complex database, a link list, a radix tree, a database, a flat file, or various other data structures.

FIB 224 may also include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward flow and/or a reverse flow of the session. As described above, when routing engine 204 receives a packet for a forward packet flow originating from a client device, e.g., source device 112A of FIG. 1, and destined for another client device, e.g., destination device 114 of FIG. 1, routing engine 204 determines whether the packet belongs to a new session (e.g., is the "first" packet or "lead" packet of a session). To determine whether the packet belongs to a new session, routing engine 204 determines whether session information 235 includes an entry corresponding to a source address, source port, destination address, destination port, and protocol of the first packet. If an entry exists, then the session is not a new session. If no entry exists, then the session is new and routing engine 204 generates a session identifier for the session and stores the session identifier in session information 235. Routing engine 204 may thereafter use the session identifier stored in session information 235 for the session to identify subsequent packets as belonging to the same session.

Services information 232 stores information that routing engine 204 may use to identify a service associated with a session. In some examples, services information 232 is in the form of a services table. For example, services information 232 comprises one or more entries that specify a service identifier and one or more of a source address, source port, destination address, destination port, or protocol associated the service. In some examples, routing engine 204 may query services information 232 with one or more of a source address, source port, destination address, destination port, or protocol of a session for a received packet to determine a service associated with a session. For example, routing engine 204 may determine a service identifier based on a correspondence of a source address, source port, destination address, destination port, or protocol in services information 232 to a source address, source port, destination address, destination port, or protocol specified by a session identifier. Routing engine 204 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing engine 204 applies, to the packet, the one or more service policies 234 that correspond to the service associated with the packet.

In some examples, network device 200 may comprise a session-based router that employs a stateful, session-based routing scheme that enables routing engine 204 to independently perform path selection and traffic engineering. The use of session-based routing may enable network device 200 to eschew the use of a centralized controller, such as an SDN controller, to perform path selection and traffic engineering, and eschew the use of tunnels. In some examples, network device 200 may implement session-based routing as Secure Vector Routing (SVR), provided by Juniper Networks, Inc. In the case where network device 200 comprises a session-based router operating as a network gateway for a site of an enterprise network, network device 200 may establish multiple peer paths over an underlying physical WAN with one or more other session-based routers operating as network gateways for other sites of the enterprise network.

Although primarily described herein as a session-based router, in other examples, network device 200 may comprise a packet-based router in which routing engine 204 employs a packet- or flow-based routing scheme to forward packets according to defined network paths, e.g., established by a centralized controller that performs path selection and traffic engineering. In the case where network device 200 comprises a packet-based router operating as a network gateway for a site of an enterprise network, network device 200 may establish multiple tunnels over an underlying physical WAN with one or more other packet-based routers operating as network gateways for other sites of the enterprise network.

In accordance with the techniques of the disclosure, control unit 202 of network device 200 is configured to collect logical path statistics, such as via BFD 225 probing and data extracted from messages and/or counters at the logical path (e.g., peer path or tunnel) level. In some examples, control unit 202 is configured to collect statistics and/or sample other data according to a first periodic interval, e.g., every 3 seconds, every 5 seconds, etc. Control unit 202 may store the collected and sampled data as path data, e.g., in a buffer. In some examples, a path data agent 238 may periodically create a package of the path data according to a second periodic interval, e.g., every 3 minutes. The collected and sampled data included in the package of path data may be referred to herein as "oc-stats." In some examples, the package of path data may also include details about clients connected to network device 200 and the associated client sessions. Path data agent 238 may then report the package of path data to NMS 130 in the cloud. In other examples, NMS 130 may request, retrieve, or otherwise receive the package of path data from network device 200 via an API, an open configuration protocol, or another of communication protocols 223. The package of path data created by path data agent 238 or another module of control unit 202 may include a header identifying network device 200 and the statistics and data samples for each of the logical paths from network device 200. In still other examples, the path data may include event-driven data such that path data agent 238 reports the event-drive path data to NMS 130 in the cloud in response to the occurrence of certain events at network device 200 as the events happen. The event-driven path data may be referred to herein as "oc-events."

Figure 3:
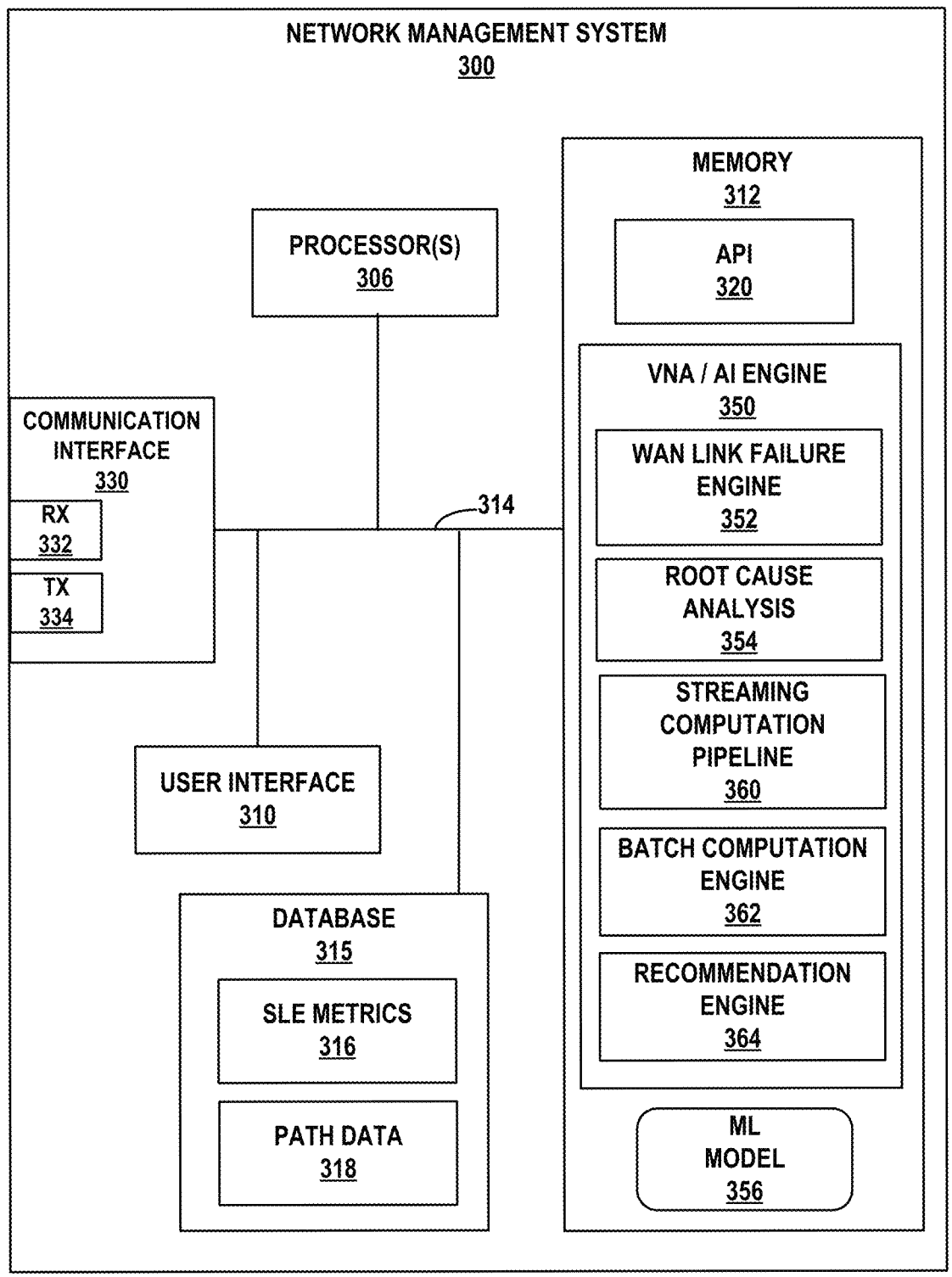
FIG. 3 is a block diagram illustrating an example network management system, in accordance with the techniques of the disclosure.

FIG. 3 shows an example network management system (NMS) 300 configured in accordance with one or more techniques of this disclosure. NMS 300 may be used to implement, for example, NMS 130 in FIGS. 1A-1C. In such examples, NMS 300 is responsible for monitoring and management of one or more of network devices 110A-110I of FIG. 1A of networks 102, routers 187A, 187B of FIGS. 1B-1C, or network device 200 of FIG. 2.

In this example, NMS 300 receives path data collected by network devices 110A-110N. The path data may comprise statistics and data samples at a logical path (e.g., peer path or tunnel) level, such as telemetry data and data extracted from messages and/or counters. In some examples, the path data may also include details about clients connected to the network devices 110. In further examples, the path data may include event-drive path data that is reported in response to the occurrence of certain events at network devices 110. NMS 300 uses the path data to calculate one or more SLE metrics in order to monitor the health condition of the logical paths from network devices 110 over an underlying physical WAN, and detect network failures and performance degradation that may impact user experiences. In some examples, NMS 300 may be a server as part of a micro-services cloud infrastructure within or accessible by network system 100 of FIGS. 1A-1C.

In some examples, in addition to monitoring network devices 110, NMS 300 is also responsible for monitoring and management of one or more wireless or wired networks (e.g., wireless network 173 and wired LAN 175 of FIG. 1), in addition to monitoring network devices of service providers or other networks. In this example, NMS 300 also receives data collected by access points from user equipment (e.g., user devices 171 of FIG. 1), such as data used to calculate one or more SLE metrics, and analyzes this data for cloud-based management of the wireless networks. In this manner, a single NMS 300 can be used for management of both network devices 110, which may include virtualized network devices (e.g., software-based routers executing on a virtual machine or container), and wireless networks, for an end-to-end WAN assurance system viewable via a single cloud-based WAN assurance portal.

NMS 300 includes a communications interface 330, one or more processor(s) 306, a user interface 310, a memory 312, and a database 315. The various elements are coupled together via a bus 314 over which the various elements may exchange data and information. Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 102 as shown in FIG. 1, and/or any wide area networks or local area networks. Communications interface 330 includes a receiver 332 and a transmitter 334 by which NMS 300 receives/transmits data and information to/from any of network devices 110 and/or any other devices or systems forming part of networks 102 or 104 such as shown in FIG. 1. The data and information received by NMS 300 may include, for example, SLE-related or event log data received from network devices 110 and used by NMS 300 to remotely monitor the performance of network devices 110 and networks 102. In some examples, NMS may further transmit data via communications interface 330 to any of network devices 110 to remotely manage networks 102.

Memory 312 includes one or more devices configured to store programming modules and/or data associated with operation of NMS 300. For example, memory 312 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes API 320, virtual network assistant (VNA)/AI engine 350, and ML model 356. VNA/AI engine 350 may include a WAN link failure engine 352, a root cause analysis engine 370, a streaming computation pipeline 360, a batch computation engine 362, and recommendation engine 362. NMS 300 may also include any other programmed modules, software engines and/or interfaces configured for remote monitoring and management of network devices 110, including remote monitoring and management of any of network devices 110. NMS 300 may also include any other programmed modules, software engines and/or interfaces configured for remote monitoring and management of wireless networks, including remote monitoring and management of any of access points.

VNA/AI engine 350 analyzes path data 318 received from network devices 110 as well as its own data to identify when undesired or abnormal states are encountered in one of networks 102. For example, VNA/AI engine 350 may use root cause analysis module 354 to identify the root cause of any undesired or abnormal states and/or may use recommendation engine 364 to determine one or more recommendations to potentially resolve the undesired or abnormal states. In some examples, root cause analysis module 354 utilizes artificial intelligence-based techniques to help identify the root cause of any poor SLE metric(s) at one or more of networks 102. In addition, VNA/AI engine 350 may automatically invoke one or more corrective actions intended to address the identified root cause(s) of one or more poor SLE metrics. Examples of corrective actions that may be automatically invoked by VNA/AI engine 350 may include, but are not limited to, invoking API 320 to reboot one or more network devices 110. The corrective actions may further include restarting a switch and/or a router, invoking download of new software to a network device, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel to address the network error.

VNA/AI engine 350 may, in some examples, construct, train, apply and retrain supervised and/or unsupervised ML model(s) 356 to event data (e.g., SLE metrics 316) to determine whether the collected network event data represents anomalous behavior that needs to be further analyzed by root cause analysis 354 of VNA/AI engine 350 to facilitate identification and resolution of faults. VNA/AI engine 350 may then apply the ML model 356 to data streams and/or logs of newly collected data (e.g., path data 318) of various network event types (e.g., connectivity events and/or statistics and data extracted from messages, counters, or the like) to detect whether the currently observed network event data with the stream of incoming data is indicative of a normal operation of the system or whether the incoming network event data is indicative of a non-typical system behavior event or trend corresponding to a malfunctioning network that requires mitigation.

When the application of the ML model 356 to path data 318 indicates that mitigation is required, VNA/AI engine 350 may invoke root cause analytics 354 to identify a root cause of the anomalous system behavior, invoke recommendation engine 364 to identify one or more recommended actions to take to correct the anomalous system behavior, and, if possible, trigger automated or semi-automated corrective action. In this way, VNA/AI engine 350 may construct and apply a ML model 356 based on a particular complex network to determine whether to perform further, resource-intensive analysis on incoming streams of path data collected (e.g., in real-time) from network devices within the complex network system.

In accordance with the techniques of this disclosure, WAN link failure engine 352 enables set up and tracking of success or failure states associated with a WAN link interface and/or path for each network device 110 and/or each network 102. WAN link failure engine 352 further analyzes SLE-related data (i.e., path data 318) collected by network devices 110, such as any of network devices 110. For example, NMS 300 receives path data 318 from network devices 110 that is indicative of one or more aspects of network performance as monitored on each logical path, e.g., peer path or tunnel, between network devices 110 in an SD-WAN over an underlying physical WAN, and stores path data 318 in database 315 over time. NMS 300 may receive a package of path data 318 from each network device 110 on a periodic interval, e.g., every 3 minutes. The data included in the package of path data 318 may be referred to herein as "oc-stats." In some examples, the package of path data 318 may also include details about clients connected to network devices 110 and the associated client sessions. The package of path data 318 received from each network device 110 may include a header identifying the respective network device 110 and multiple statistics and data samples for each of the logical paths. In some examples, path data 318 may include event-driven data received from network devices 110 in response to the occurrence of certain events at network devices 110 as the events happen. The event-driven path data may be referred to herein as "oc-events." In some examples, NMS 300 may store path data 318 in a database having a micro-services cloud infrastructure with no scaling limits.

NMS 300 executes WAN link failure engine 352 to determine whether a wireless logical path is suffering from poor link quality (e.g., poor logical path performance) and, in response to determining that the wireless logical path is suffering from poor link quality, whether the poor link quality is caused by poor wireless signal quality of the wireless logical path. Such a wireless logical path may be a logical path from a wireless physical interface, such as an LTE physical interface.

WAN link failure engine 352 may determine for a time period, the link quality of a wireless logical path based on path data 318 for the wireless logical path. For example, path data 318 for the wireless logical path may indicate jitter, latency, and loss for the wireless logical path during the time period. WAN link failure engine 352 may also determine, for the time period, the link quality of the wireless logical path based on logical path statistics via BFD probing, such as information that indicates link failure of the wireless logical path during the time window. Similarly, NMS 300 may determine, for the time period, the wireless signal quality of a wireless logical path based on path data 318 for the wireless logical path. For example, path data 318 for the wireless logical path may indicate values for the SNR, RSSI, RSRP, RSRQ, and the like for the logical path during the time period, and NMS 300 may determine, for the time period, the wireless signal quality of a wireless logical path based on such values. WAN link failure engine 352 may periodically sample path data 318 for the wireless logical path to determine the link quality and the wireless quality of the wireless logical path. For example, WAN link failure engine 352 may sample path data 318 for the wireless logical path every 3 seconds, every 5 seconds, and the like.

If WAN link failure engine 352 determines that the link quality of the wireless logical path during the time period is poor, WAN link failure engine 352 may determine whether the poor link quality of the wireless logical path during the time period correlates to poor wireless signal quality of the wireless logical path during the time period. In some examples, if WAN link failure engine 352 determines that both the link quality of the wireless logical path during the time period and the wireless signal quality of the wireless logical path during the time period are poor, WAN link failure engine 352 may determine that the poor link quality of the wireless logical path during the time period correlates to poor wireless signal quality of the wireless logical path during the time period. WAN link failure engine 352 may, in response to determining that the poor link quality of the wireless logical path during the time period correlates to poor wireless signal quality of the wireless logical path during the time period, determine a correlation between the poor wireless quality of the logical path and the poor link quality of the wireless logical path during the time period.

In some examples, WAN link failure engine 352 may determine whether instances of poor link quality of the wireless logical path during the time period correlates to instances of poor wireless signal quality of the wireless path during the time period to determine whether the poor link quality of the wireless logical path during the time period corresponds to poor wireless signal quality of the wireless logical path during the time period. That is, WAN link failure engine 352 may, for an occurrence of poor link quality of the wireless logical path during the time period, determine whether the occurrence of the poor link quality is at the same time as an occurrence of poor wireless signal quality of the wireless logical path. WAN link failure engine 352 may determine the number of occurrences of poor link quality of the logical path during the time period is at the same time as an occurrence of poor wireless signal quality of the wireless logical path, and may determine whether the poor link quality of the wireless logical path during the time period corresponds to poor wireless signal quality of the wireless logical path during the time period based on the number of occurrences of poor link quality of the logical path during the time period is at the same time as an occurrence of poor wireless signal quality of the wireless logical path. WAN link failure engine 352 may, in response to determining that the poor link quality of the wireless logical path during the time period corresponds to poor wireless signal quality of the wireless logical path during the time period, determine that the poor wireless quality of the logical path is a potential root cause for the poor link quality of the wireless logical path during the time period, and therefore that a correlation exists between the poor wireless quality of the logical path during the time period and the poor link quality of the logical path during the time period.

VNA/AI engine 350 may output a notification including identification of the potential root cause of the poor link quality. In some scenarios, VNA/AI engine 350 may output the notification via a user interface for display on a user interface device of an administrator associated with the enterprise network. In some examples, the notification includes a recommendation to perform one or more remedial actions to address the root cause identified in the notification. For example, VNA/AI engine 350 may, in response to determining a correlation between poor wireless quality of a wireless logical path and poor link quality of the wireless logical path during the time period, VNA/AI engine 350 may output a notification that includes a recommendation to check the connection of the wireless physical interface(s) that communicate via the wireless logical path. In other examples, VNA/AI engine 350 may automatically invoke one or more remedial actions to address the root cause identified in the notification. For example, VNA/AI engine 350 may reroute a logical path to bypass the wireless physical interface having poor wireless quality (e.g., poor signal strength).

NMS 300 may execute streaming computation pipeline 360 and batch computation engine 362 to determine whether clients (e.g., network devices) connected via wireless logical paths to a network device's physical interface (e.g., an LTE physical interface) is suffering from poor link quality (e.g., poor logical path performance). NMS 300 may, in response to determining that the wireless logical paths are suffering from poor link quality, determine whether the poor link quality of the wireless logical paths is caused by poor wireless signal quality of the wireless physical interface of the network device to which the wireless logical paths are connected.

Streaming computation pipeline 360 may, for the wireless physical interface of a particular network device, process and join two data streams. The first data stream may contain wireless signal strength of the wireless physical interface over a period of time and jitter, latency, and loss over the period of time for each wireless logical path connected to the wireless physical interface. The second stream may contain information regarding clients (e.g., other one or more of network devices 110) connected to the wireless physical interface via wireless logical paths during the period of time. For example, the first stream may include link quality for each of the wireless logical paths connected to the wireless physical interface of the particular physical device, as determined by WAN link failure engine 352 based on path data 318 and/or logical path statistics, and may also include wireless signal strength of the wireless physical interface, as determined by WAN link failure engine 352 based on path data 318.

Streaming computation pipeline 360 may output, based on the two data streams inputted into streaming computation pipeline 360, aggregated data for the wireless physical interface, where the aggregated data may include the wireless signal strength of the wireless physical interface, link quality for each of the wireless logical paths connected to the wireless physical interface, and information regarding the clients connected to the wireless physical interface via wireless logical paths. The aggregated data may be aggregated over a specified time period, such as over 10 minutes, 20 minutes, 30 minutes, and the like.

Batch computation engine 362 may receive, as input, the aggregated data for the wireless physical interface over the specified time period, as outputted by streaming computation pipeline 360, and may generate relevant features associated with the wireless physical interface during the specified time period. Such relevant features may include the number of service level agreement (SLA) violations associated with the wireless physical interface during the time period, the magnitude of any deviations from the SLAs during the time period, variance of wireless signal strength during the time period, latency during the time period, jitter during the time period, and loss over the time period.

Batch computation engine 362 may determine one or more events associated with the wireless physical interface during the time period based at least in part on the relevant features associated with the wireless physical interface during the specified time period. In some examples, an event may be a sub-period within the time period during which poor wireless signal quality of the wireless logical path correlates with poor link quality of one or more wireless logical paths connected to the wireless physical interface. For example, batch computation engine 362 may determine, for a sub-period of the time period, the amount of time in which the wireless physical interface experiences both poor link quality of one or more wireless logical paths and poor wireless signal quality. If batch computation engine 362 determines, for the sub-period, that the amount of time in which the wireless physical interface experiences both poor link quality of one or more wireless logical paths and poor wireless signal quality exceeds a specified threshold, such as a threshold percentage of total time in the sub-period, batch computation engine 362 may determine the occurrence of an event during the sub-period.

Batch computation engine 362 may, for an event, determine the severity of the event based on cross-batched aggregated features. Batch computation engine 362 may receive batches of the aggregated data for wireless physical interfaces over a large SD-WAN deployment, where each batch of the aggregated data is associated with a particular time period. Batch computation engine 362 may generate relevant features associated with each batch of the aggregated data and may determine events in the aggregated data, such as time periods during which a wireless physical interface experiences both poor link quality of one or more wireless logical paths and poor wireless signal quality.

Batch computation engine 362 may determine the severity of the event based on cross-batched aggregated features by comparing information associated with the event, such as the amount of time in which the wireless physical interface experiences both poor link quality of one or more wireless logical paths and poor wireless signal quality, with other events in the aggregated data to determine the severity of the event. For example, if the amount of time in which the wireless physical interface experiences both poor link quality of one or more wireless logical paths and poor wireless signal quality is greater than a specified percentile (e.g., $90^{th}$ percentile) of the amount of time in which a wireless physical interface experiences both poor link quality of one or more wireless logical paths and poor wireless signal quality associated with the other events in the aggregated data, batch computation engine 362 may determine that the event is highly severe.

Recommendation engine 364 may determine, for an event determined by batch computation engine 362, a recommended action to take to correct the poor link quality and the poor wireless signal quality associated with the event. For example, if the event is associated with a correlation between a wireless physical interface experiencing both poor link quality of one or more wireless logical paths and poor wireless signal quality, recommendation engine 364 may generate a recommendation to check the connection of the wireless physical interface. NMS 300 may therefore output the generated recommendation at user interface 310. In some examples, if the symptoms of the event (e.g., poor link quality and/or poor wireless signal quality) disappears for a specified validation window, NMS 30 may stop outputting the generated recommendation at user interface 310.

Figure 4:
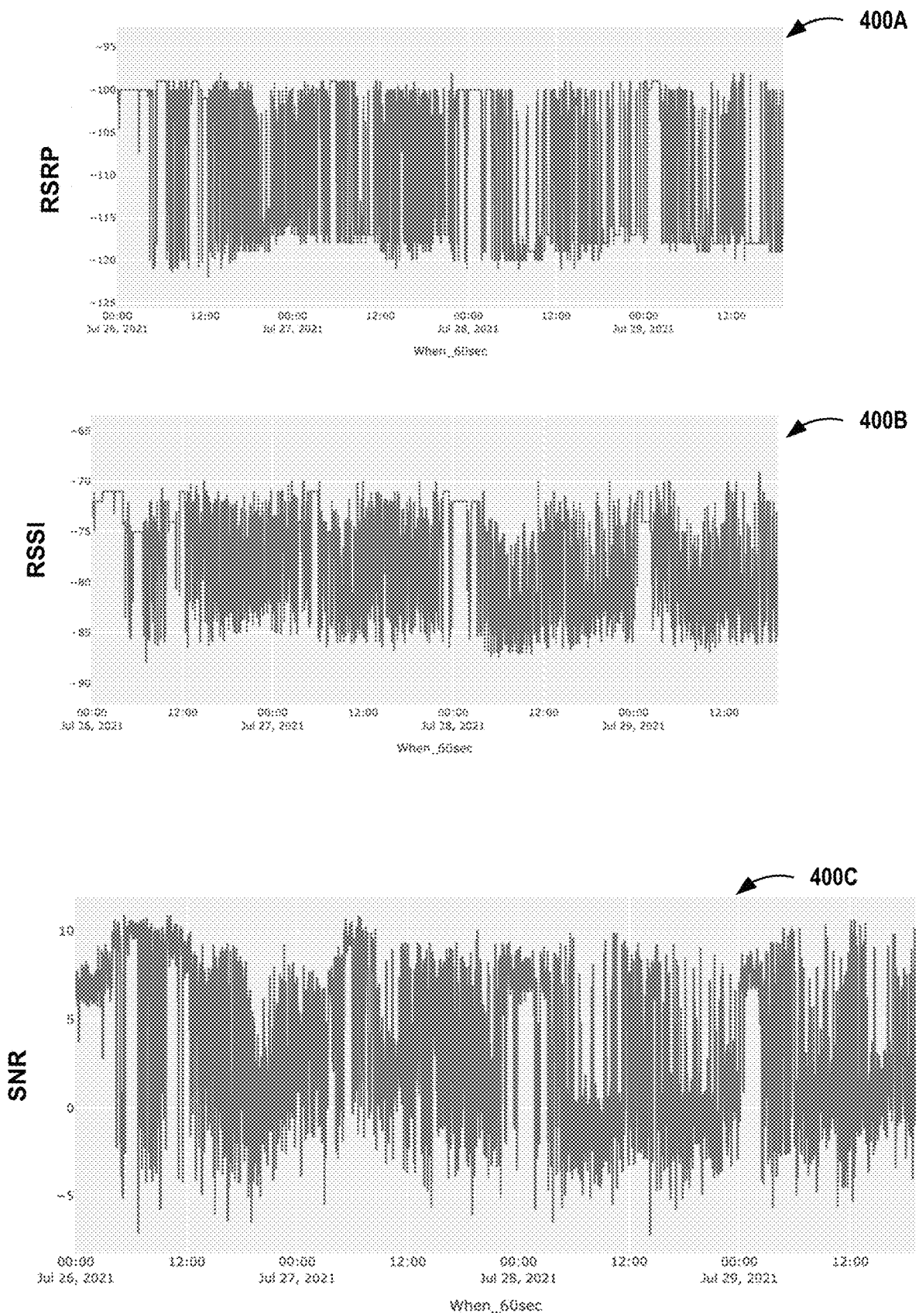
FIG. 4 illustrates graphs of wireless signal parameters of a wireless logical path, in accordance with aspects of this disclosure.

FIG. 4 illustrates graphs of wireless signal parameters of a wireless logical path, in accordance with aspects of this disclosure. As shown in FIG. 4, graph 400A is a graph of the RSRP of a logical path over time, graph 400B is a graph of the RSSI of a logical path over time, and graph 400C is a graph of the SNR of a logical path over time. In graphs 400A-400C, the RSRP, RSSI, and SNR may be resampled to one-minute resolution, and NMS 300 may determine such RSSI, RSRP, and SNR values under the "lte_stats" field of the "oc-stats-analytics" messages determined from the received path data 318.

Wireless signal parameters, in some examples, may be LTE metrics of a logical path over LTE. Table 1, below, describes the different measures used to determine the quality of a wireless signal, such as an LTE signal.

TABLE 1

| Band | RSSI | RSRP (dBm) | SNR (dB) | RSRQ(dB) |
|---|---|---|---|---|
| Excellent | >−65 | >−84 | >12.5 | >−.5 |
| Good | −65 to −75 | −85 to −102 | 10 to 12.5 | −9 to −5 |
| Fair | −75 to −85 | −103 to −111 | 7 to 10 | −12 to −9 |
| Poor | <−85 | <−111 | <7 | <−12 |

Figure 5:
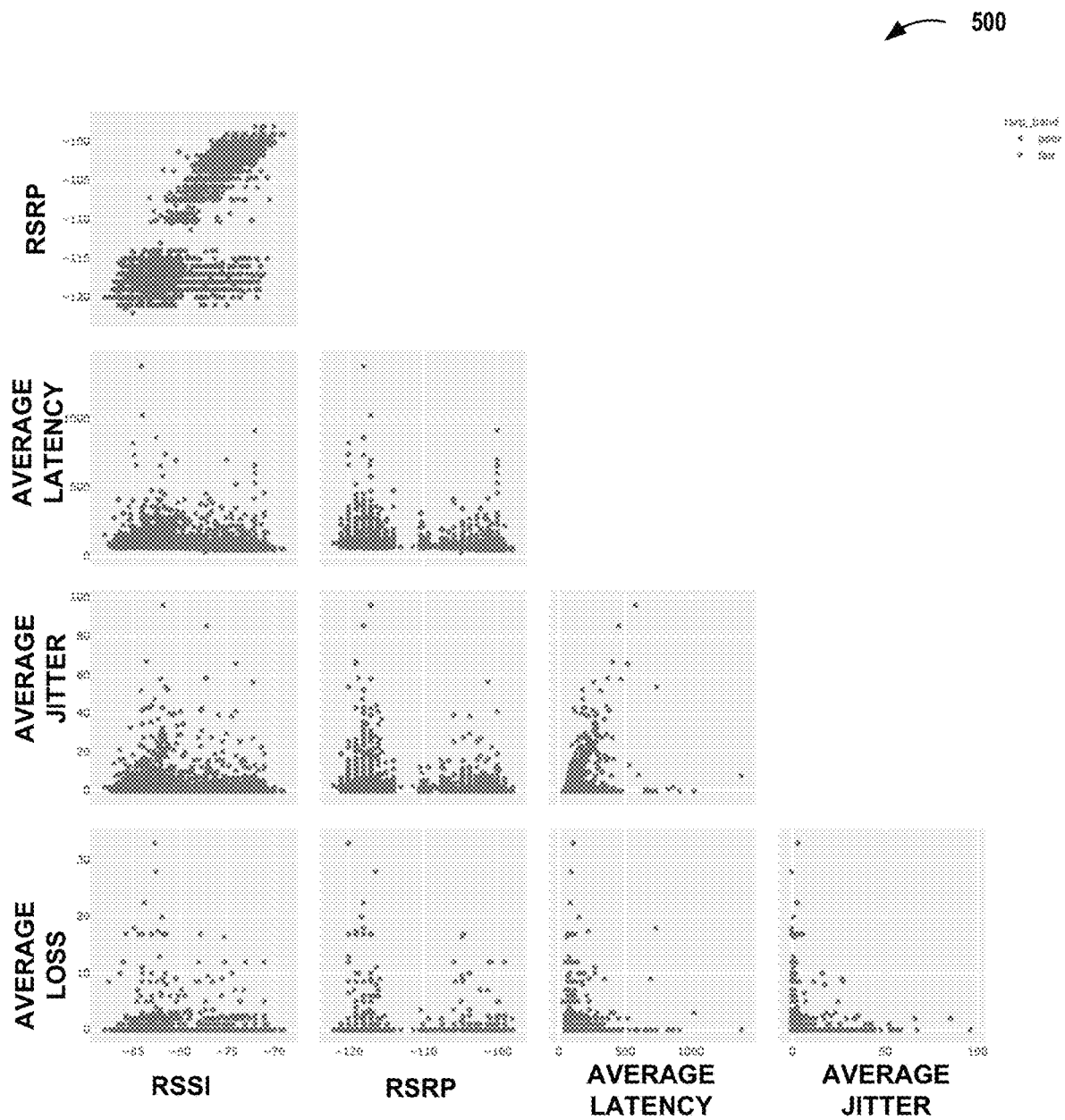
FIG. 5 illustrates a correlation matrix between wireless signal parameters of a wireless logical path and peer path statistics for the wireless logical path, in accordance with aspects of the disclosure.

FIG. 5 illustrates a correlation matrix between wireless signal parameters of a wireless logical path and peer path statistics for the wireless logical path, in accordance with aspects of the disclosure. As shown in FIG. 5, correlation matrix 500 while RSSI and RSRP are correlated in "fair" region but not in "poor" region, binning by RSRP shows some effect on latency and jitter.

Figure 6:
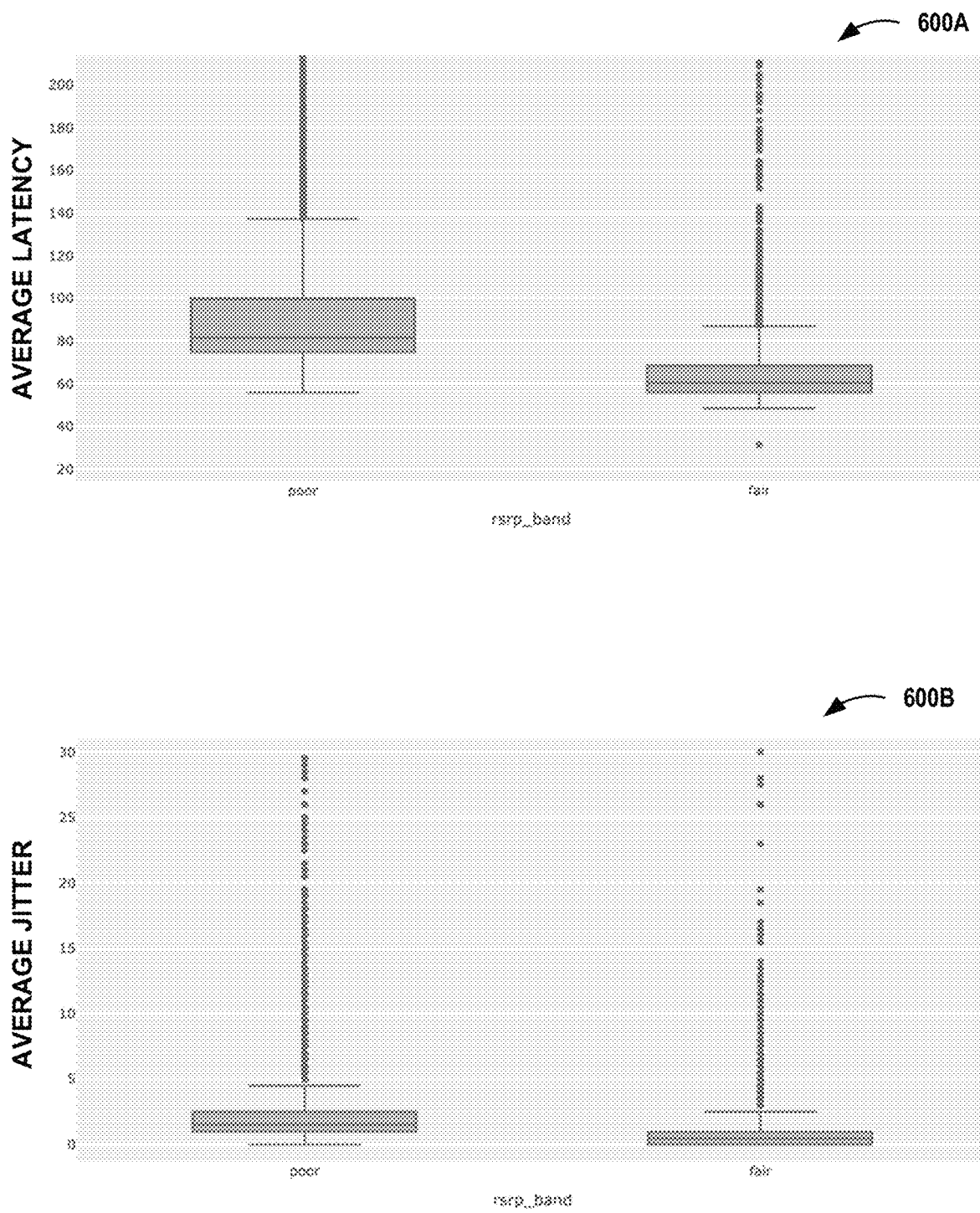
FIG. 6 illustrates bucketing latency and jitter of a logical path by RSRP quality, in accordance with aspects of the disclosure.

FIG. 6 illustrates bucketing latency and jitter of a logical path by RSRP quality, in accordance with aspects of the disclosure. As shown in FIG. 6, graph 600A illustrates latency of a logical path bucketed by RSRP quality and graph 600B illustrates jitter of a logical path bucketed by RSRP quality. The RSRP quality shown in FIG. 6, may correspond to the LTE metrics in Table 1, where poor RSRP quality is RSRP that is less than −111 dBm, and where fair RSRP quality is RSRP that is between −103 and −111 dBm. Graph 600A illustrates that latency is approximately 20 milliseconds longer with poor RSRP compared with fair RSRP, and that latency exhibits more variation with poor RSRP compared with fair RSRP. Graph 600B illustrates that jitter is slightly greater with poor RSRP compared with fair RSRP.

Figure 7:
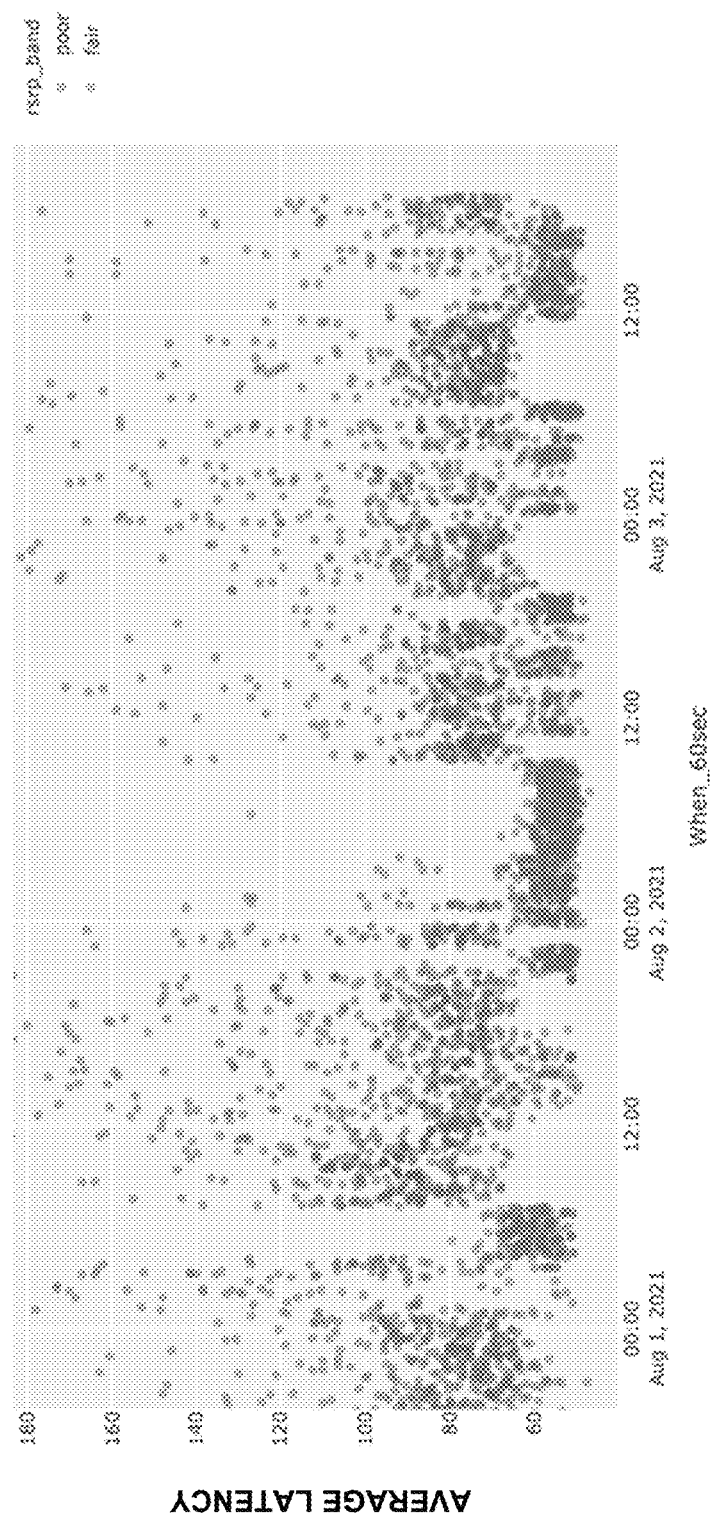
FIG. 7 illustrates an example of real-time latency based on RSRP, in accordance with aspects of the disclosure.

FIG. 7 illustrates an example of real-time latency based on RSRP, in accordance with aspects of the disclosure. As shown in FIG. 7, graph 700 illustrates latency of logical paths over time based on RSRP quality. As illustrated in graph 700, the latency is greater when the RSRP is poor compared with the latency when the RSRP is fair. As the RSRP of a logical path changes over time, the latency may correspondingly change, such as by increasing when the RSRP is poor and decreasing when the RSRP is fair.

Figure 8A:
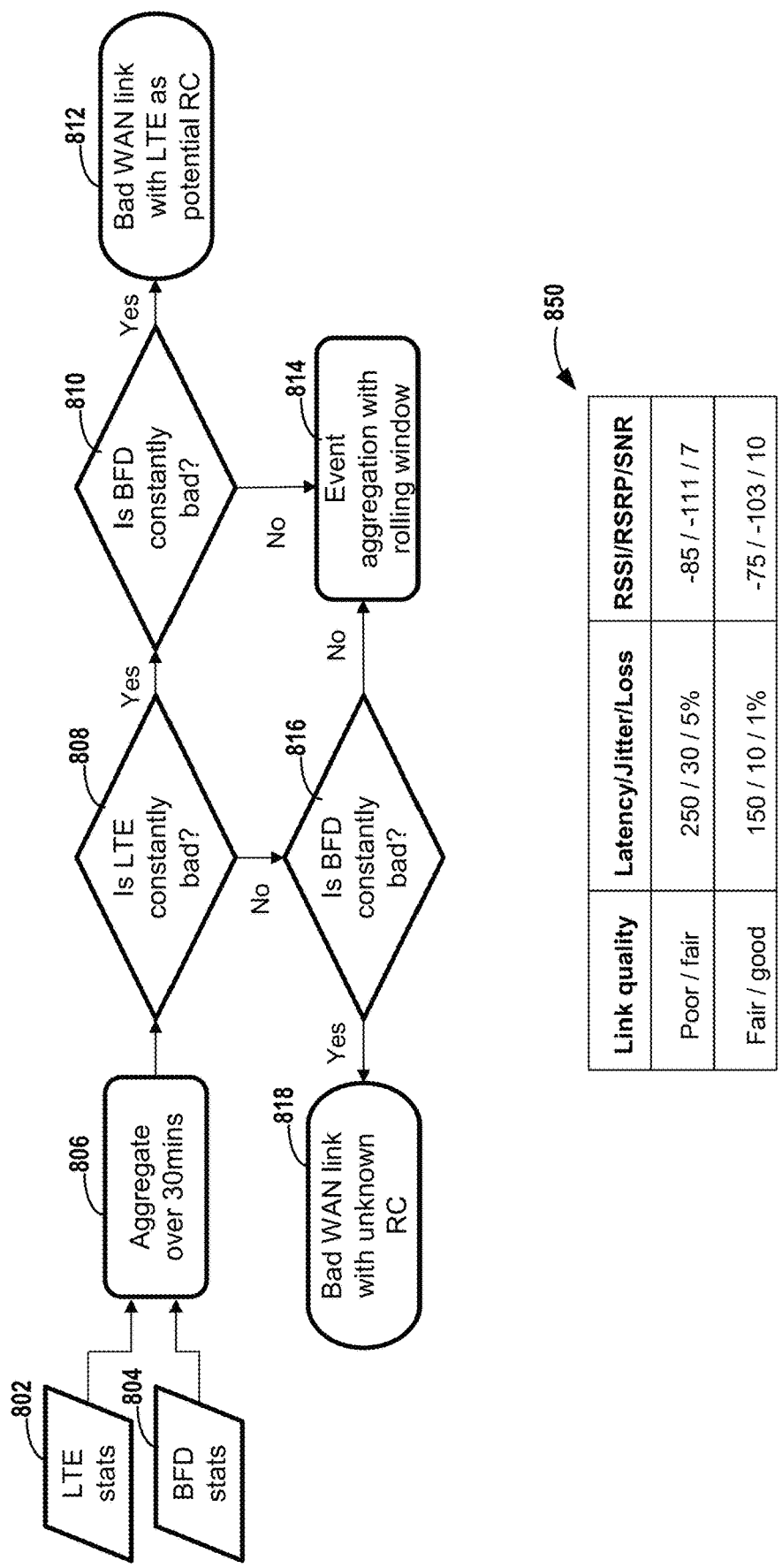
FIGS. 8A and 8B illustrate a process for determining whether a poor link quality is caused by poor signal quality, in accordance with aspects of the disclosure.
Figure 8B:
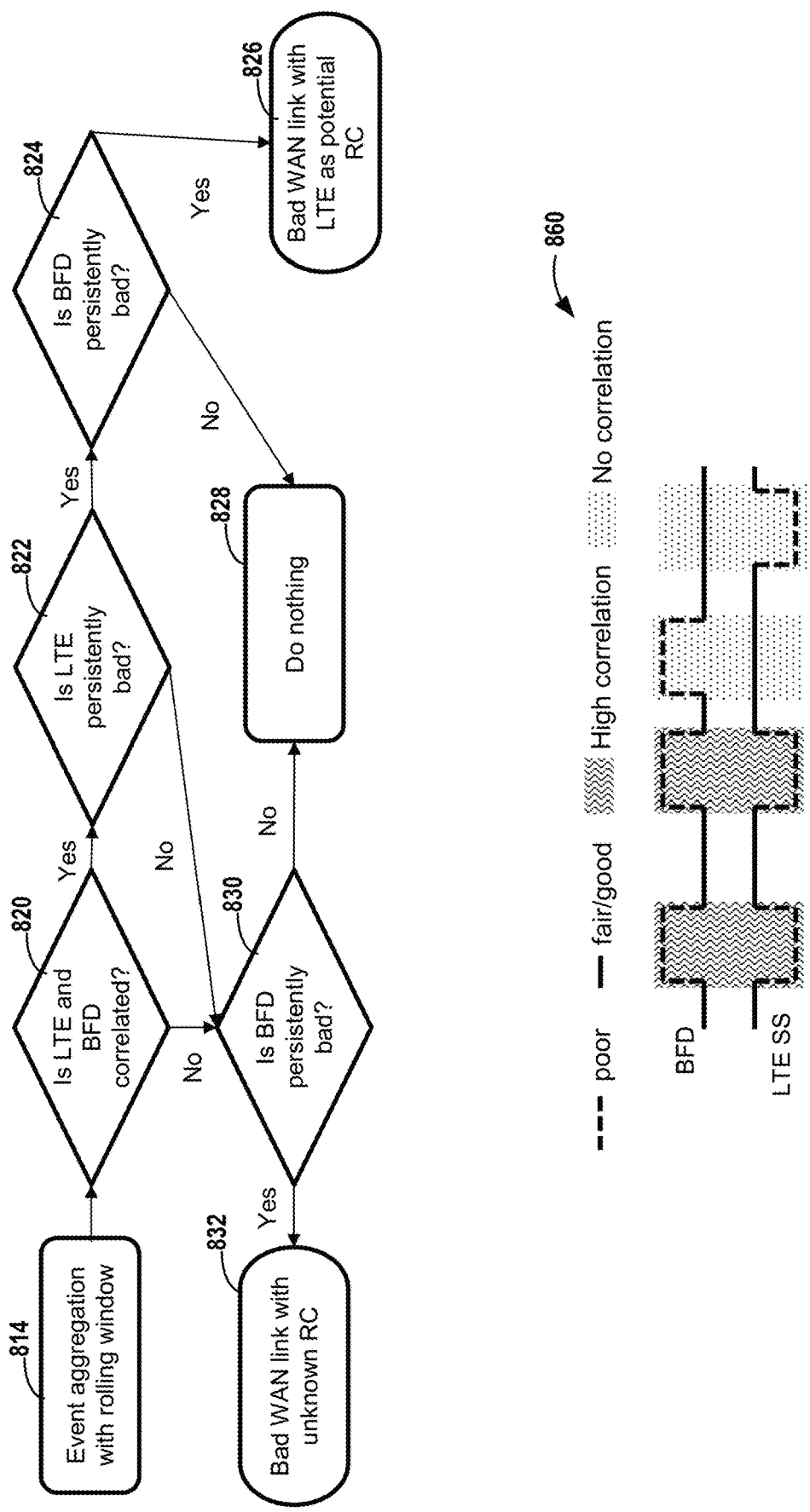

FIGS. 8A and 8B illustrate a process for determining whether a poor link quality is caused by poor signal quality, in accordance with aspects of the disclosure. The techniques of FIGS. 8A and 8B are described with respect to FIG. 1. As shown in FIG. 8A, NMS 130 may collect wireless signal quality statistics 802 for a wireless logical path and link quality statistics 804 for the wireless logical path for a specified period of time, such as for thirty minutes (806). The wireless signal quality statistics may include values for the SNR, RSRP, and/or RSSI of the logical path over the specified period of time. The link quality statistics 804 may include the jitter, latency, and loss of the logical link over the specified period of time, information about link failures of the logical path during the specified period of time as determined via BFD, and the like.

NMS 130 may determine, based on the wireless signal quality statistics 802, whether the wireless signal quality is consistently bad during the specified time period (808). For example, table 850 includes RSSI, RSRP, and SNR values associated with a logical link having poor wireless signal quality and RSSI, RSRP, and SNR values associated with a logical link having fair or good wireless signal quality, and NMS 130 may compare the RSSI, RSRP, and SNR values associated with the logical link with the RSSI, RSRP, and SNR values in table 850 to determine whether the wireless signal quality is consistently bad during the specified time period.

If NMS 130 determines that wireless signal quality is consistently bad during the specified time period (YES at 808), NMS 130 may determine whether the link quality is consistently bad during the specified time period (810). For example, table 850 also includes jitter, latency, and loss values associated with a logical link having poor link quality and jitter, latency, and loss values associated with a logical link having fair or good link quality, and NMS 130 may compare the jitter, latency, and loss values associated with the logical link with the jitter, latency, and loss values in table 850 to determine whether the link quality is consistently bad during the specified time period.

If NMS 130 determines that the link quality is consistently bad during the specified time period (YES at 810), NMS 130 may determine that the logical path is a bad WAN link during the specified time period that is potentially caused by poor wireless signal quality during the time period (812). If NMS 130 determines that the link quality is not consistently bad during the specified time period (NO at 810), NMS 130 may aggregate the wireless signal quality statistics 802 for the logical path and link quality statistics 804 for the wireless logical path over a longer rolling window for further analysis, as further illustrated in FIG. 8B (814).

If NMS 130 determines that wireless signal quality is not consistently bad during the specified time period (NO at 808), NMS 130 may determine whether the link quality is consistently bad during the specified time period (816). NMS 130 may compare the jitter, latency, and loss values associated with the logical link with the jitter, latency, and loss values in table 850 to determine whether the link quality is consistently bad during the specified time period.

If NMS 130 determines that the link quality is consistently bad during the specified time period (YES at 816), NMS 130 may determine that the logical path is a bad WAN link during the specified time period with an unknown root cause for the bad WAN link (818). If NMS 130 determines that the link quality is not consistently bad during the specified time period (NO at 816), NMS 130 may aggregate the wireless signal quality statistics 802 for the logical path and link quality statistics 804 for the wireless logical path over a longer rolling window for further analysis (814).

As shown in FIG. 8, NMS 130 may aggregate the wireless signal quality statistics 802 for the logical path and link quality statistics 804 for the wireless logical path over a longer rolling window for further analysis (814) and may determine whether the wireless signal quality for the logical path and the link quality of the logical path are correlated (820). As shown in graph 860, the link quality and the wireless signal quality of a logical path are correlated during a specified time window (e.g., a one minute time window) if the link quality is poor and the wireless signal quality is poor during the same time window.

NMS 130 may therefore collect wireless signal quality statistics 802 for the logical path and link quality statistics 804 for a logical path over multiple windows over a time period (e.g., a day), to determine the number of times the wireless signal quality for the logical path and the link quality of the logical path are correlated during the time period. If NMS 130 determines that the number of times the wireless signal quality for the logical path and the link quality of the logical path are correlated during the time period is greater than a correlation threshold, NMS 130 may determine that the wireless signal quality for the logical path and the link quality of the logical path are correlated.

If NMS 130 determines that the wireless signal quality for the logical path and the link quality of the logical path are correlated (YES at 820), NMS 130 may determine whether the wireless signal quality of the logical link is consistently poor (822). NMS 130 may, for example, determine whether the count of times the logical path has poor wireless signal quality exceeds a poor wireless signal quality threshold to determine whether the wireless signal quality of the logical link is consistently poor over the time period. If NMS 130 determines that the count of times the logical path has poor wireless signal quality exceeds a poor wireless signal quality threshold, NMS 130 may determine the wireless signal quality of the logical link is consistently poor over the time period.

If NMS 130 determines that the wireless signal quality of the logical link is consistently poor over the time period (YES at 822), NMS 130 may determine whether the link quality of the logical link is consistently bad (824). NMS 130 may, for example, determine whether the count of times the logical path has poor link quality exceeds a poor link quality threshold to determine whether the link quality of the logical link is consistently poor over the time period. If NMS 130 determines that the count of times the logical path has poor link quality exceeds a poor link quality threshold, NMS 130 may determine the link quality of the logical link is consistently poor over the time period.

If NMS 130 determines that the link quality of the logical link is consistently poor over the time period (YES at 824), NMS 130 may determine that the logical path is a bad WAN link during the specified time period that is potentially caused by poor wireless signal quality during the time period (826). If NMS 130 determines that the link quality of the logical link is not consistently poor over the time period (NO at 824), NMS 130 may refrain from taking further action (826).

If NMS 130 determines that the wireless signal quality for the logical path and the link quality of the logical path not correlated (NO at 820) or if NMS 130 determines that the wireless signal quality of the logical link is not consistently poor over the time period (NO at 822), NMS 130 may determine whether the link quality of the logical link is consistently bad (830). If NMS 130 determines that the link quality of the logical link is not consistently poor over the time period (NO at 830), NMS 130 may refrain from taking further action (826). If NMS 130 determines that the link quality of the logical link is consistently poor over the time period (YES at 830), NMS 130 may determine that the logical path is a bad WAN link during the specified time period with an unknown cause during the time period (832).

Figure 9:
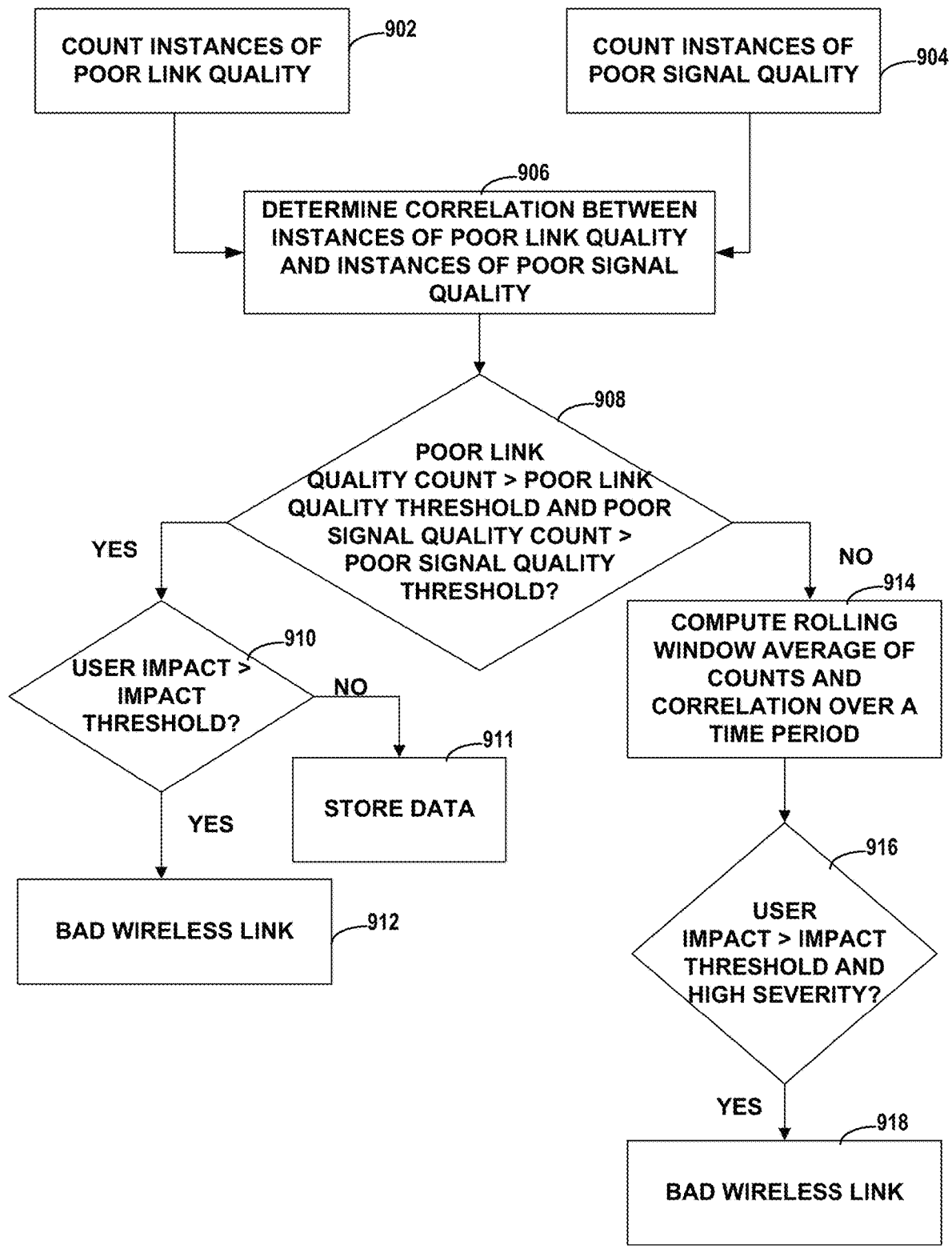
FIG. 9 illustrates a process for determining whether a poor link quality is caused by poor signal quality, in accordance with aspects of the disclosure.

FIG. 9 illustrates a process for determining whether a poor link quality is caused by poor signal quality, in accordance with aspects of the disclosure. The techniques of FIG. 9 are described with respect to FIG. 1. As shown in FIG. 9 NMS 130 may, for a wireless logical path, count instances of poor link quality (902) and instances of poor wireless signal quality (904) within a time window, such as within a 60 minute time window. NMS 130 may utilize path data for the wireless logical path to perform such counting of instances of poor link quality and poor wireless signal quality during the time window.

The path data for the wireless logical path may be periodically updated, such as every 3 minutes, every 5 minutes, and the like. NMS 130 may periodically sample the updated path data, such as every 3 seconds, every 5 seconds, and the like, for the latest link quality data and wireless signal quality data included in the path data.

For example, if the path data includes BFD data, the path data may indicate the link failures of the wireless logical path during the time window, and NMS 130 may determine the count of instances of poor link quality as the number of link failures during the time window. Similarly, the path data may indicate values of SNR, RSSI, and/or RSRP of the logical link during the time window, and NMS 130 may determine a count of the instances of poor wireless signal quality during the time window based on the SNR, RSSI, and/or RSRP values during the time window.

NMS 130 may also determine a correlation between the poor link quality of the logical link during the time window and the poor wireless signal quality of the logical link during the time window (906). For example, the correlation between the poor link quality of the logical link during the time window may be associated with the number of times an instance of poor link quality during the time window occurs at the same time as an instance of poor wireless signal quality during the time window.

NMS 130 may determine whether, during the time window, the count of the instances of poor link quality exceeds a poor link quality threshold and the count of the instances of poor wireless signal quality exceeds a poor wireless signal quality threshold (908). For example, the count of the instances of poor link quality exceeds a poor link quality threshold if the number of instances of poor link quality during the time period exceeds 95% of the samples of link quality values during the time period. Similarly, for example, the count of the instances of poor wireless signal quality exceeds a poor wireless signal quality threshold if the instances of poor wireless signal quality during the time period exceeds 95% of the samples of wireless signal quality values the time period.

If NMS 130 determines that the count of the instances of poor link quality exceeds a poor link quality threshold and the count of the instances of poor wireless signal quality exceeds a poor wireless signal quality threshold (YES at 908), NMS 130 may determine whether the user impact of such poor link quality during the time period exceeds a user impact threshold (910). The user impact of the poor link quality during the time period may be the number of client sessions impacted by the poor link quality over the time period. In some examples, if the number of client sessions impacted by the poor link quality over the time period exceeds ten client sessions, NMS 130 may determine that the user impact of such poor link quality during the time period exceeds a user impact threshold. If NMS 130 determines that the user impact of such poor link quality during the time period exceeds a user impact threshold (YES at 910), NMS 130 may determine that the logical path is a bad WAN link during the specified time period that is potentially caused by poor wireless signal quality during the time period. Otherwise (NO at 910), NMS 130 may store the counts of the instances of poor link quality of the logical path and of the instances of poor wireless signal quality of the logical path and the correlation of poor link quality and poor wireless signal quality (911).

If NMS 130 determines that either the count of the instances of poor link quality does not exceed a poor link quality threshold or that the count of the instances of poor wireless signal quality does not exceed a poor wireless signal quality threshold (NO at 908), NMS 130 may compute a longer (e.g., one day) rolling window averages of counts of the instances of poor link quality of the logical path and of the instances of poor wireless signal quality of the logical path, along with correlations of poor link quality and poor wireless signal quality (914).

NMS 130 may determine whether the user impact of such poor link quality exceeds a user impact threshold and whether the severity of the user impact exceeds a severity threshold (916). NMS 130 may determine the severity of the user impact as the number of times the number of instances where the client sessions impacted by the poor link quality corresponds to an instance of poor wireless signal quality. If NMS 130 determines that the user impact of such poor link quality exceeds a user impact threshold and the severity of the user impact exceeds a severity threshold (YES at 916), NMS 130 may determine that the logical path is a bad WAN link that is potentially caused by poor wireless signal quality (918). NMS 130 may also perform a ranking of bad WAN links in the WAN by user impact and/or the severity.

Figure 10:
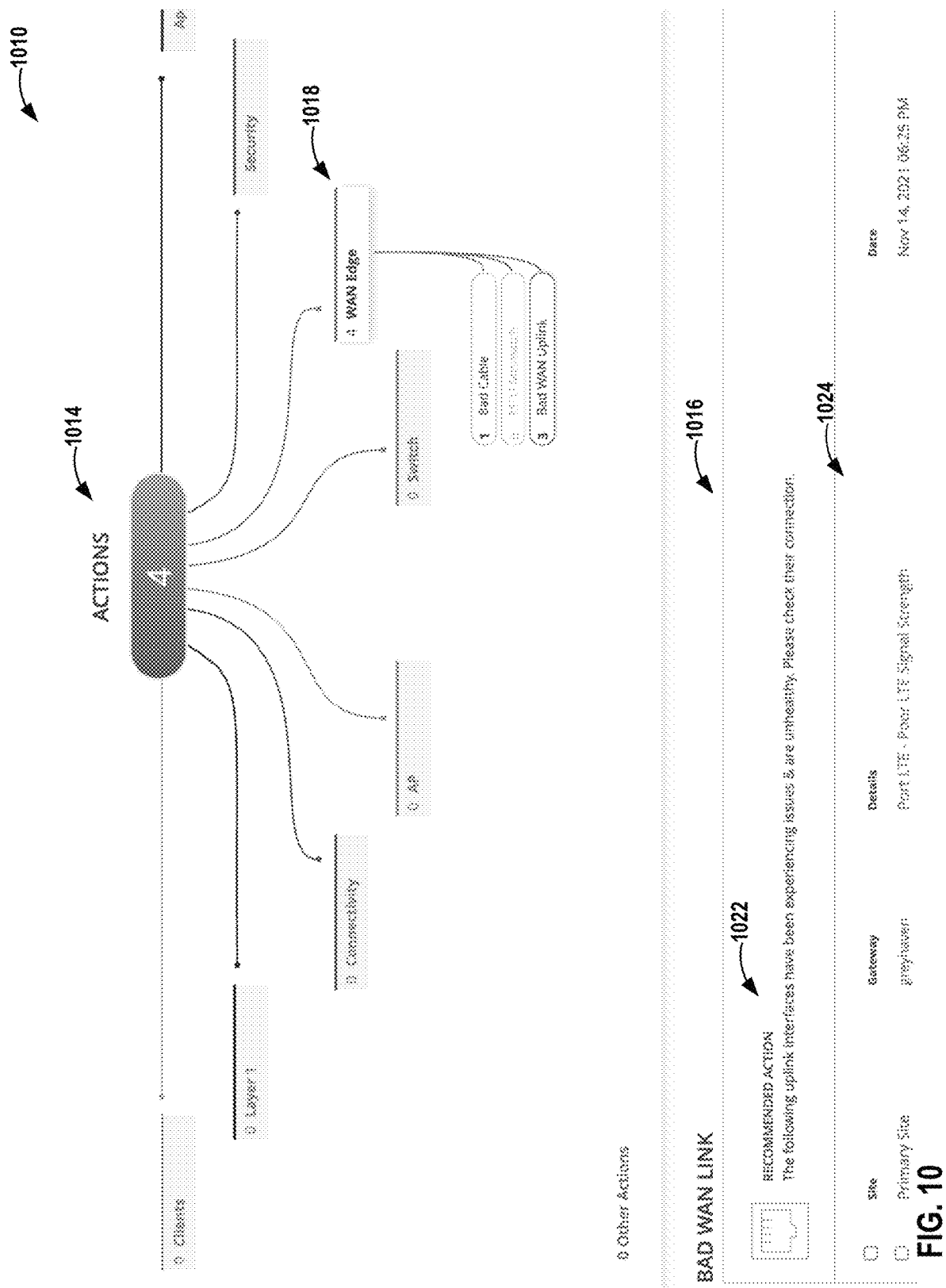
FIG. 10 illustrates an example WAN link health user interface of the NMS for display on a user interface device, in accordance with the techniques of this disclosure.

FIG. 10 illustrates an example WAN link health user interface 1010 of the NMS for display on a user interface device, in accordance with the techniques of this disclosure. As shown in the illustrated example of FIG. 10, an NMS, such as NMS 130 of FIGS. 1A-1C or NMS 300 of FIG. 3 may output user interface 1110 that includes an action portion 1014 and a category details portion 1016. Action portion 1014 may indicate, for a WAN, actions associated with different categories of items in the WAN. Specifically, action portion 1014 may include WAN edge category 1018 that indicates the number of recommended actions (e.g., 4) for network devices 110 at the WAN edge. In the example of FIG. 10, WAN edge category 1018 indicates that there is 1 recommended action for a bad cable and there are 3 recommended actions for a bad WAN uplink.

Category details portion 1016 may indicate details of the recommended actions for WAN edge category 1018. Specifically, category details portion 1016 may indicate recommended action 1022 that recommends checking the connection of uplink interfaces (e.g., LTE interfaces) that have been experiencing issues and are unhealthy, and category details portion 1016 may indicate a list of the referenced uplink interfaces. For example, recommended action 1022 may include, for an uplink interface associated with a recommended action, indicate the details 1024 of a specific uplink interface that may have a correlation between poor link quality of wireless logical links of the uplink interface and poor wireless signal quality of the uplink interface. For example, details 1024 of the specific uplink interface may indicate the site of the uplink interface, the gateway of the uplink interface, the details of the specific issues of the uplink interface (e.g., correlation between poor link quality of wireless logical links and poor wireless signal quality), and a date and time at which the specific issues of the uplink interface was determined.

Figure 11:
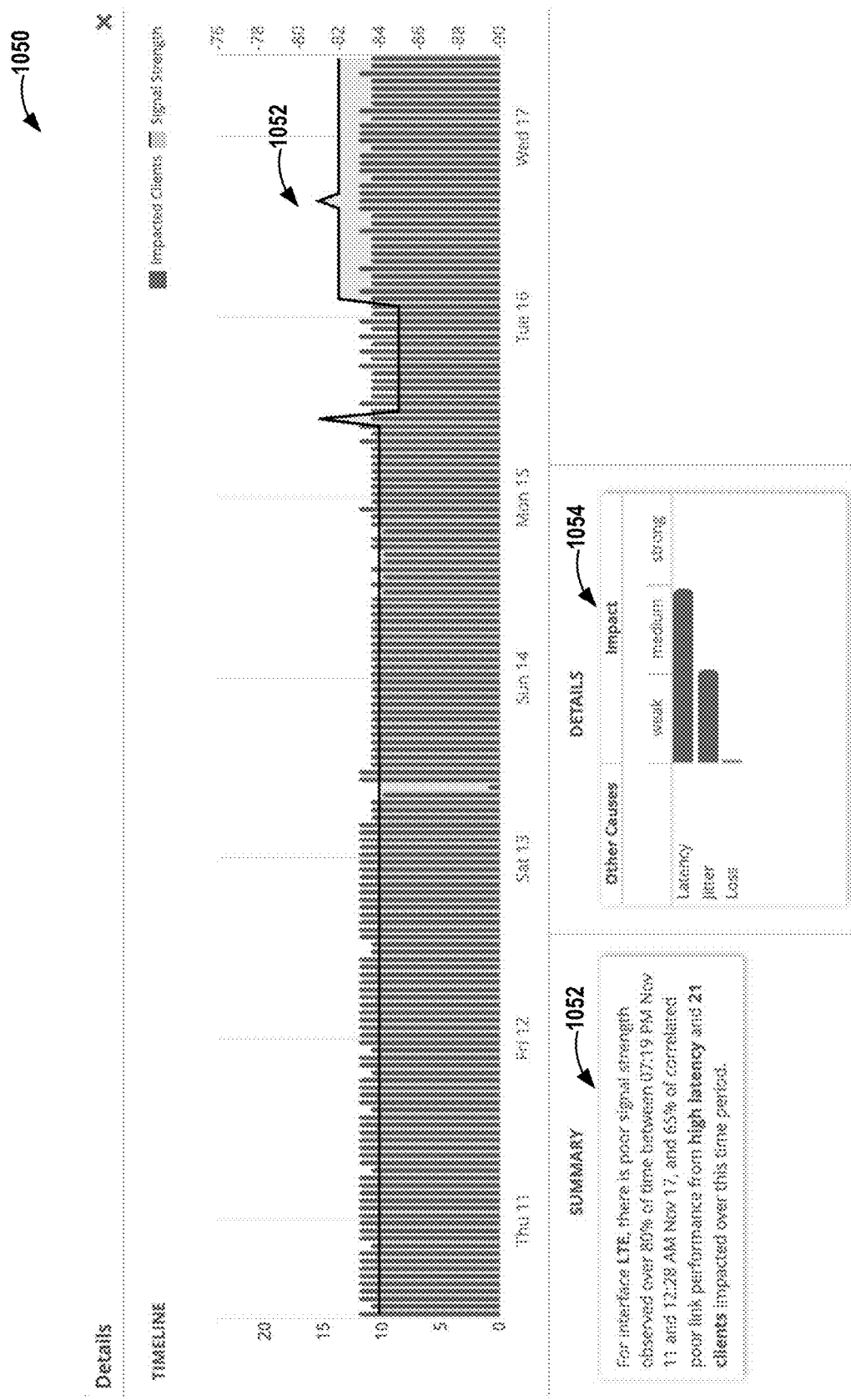
FIG. 11 illustrates an example uplink details user interface of the NMS for display on a user interface device, in accordance with the techniques of this disclosure.

When a user provides user input to select details 1024 of a specific uplink interface, the NMS may output, for display on a user interface device, an example uplink details user interface. FIG. 11 illustrates an example uplink details user interface 1050 of the NMS for display on a user interface device, in accordance with the techniques of this disclosure. Uplink details user interface 1050 may be an example of an uplink detail user interface outputted by NMS in response to user selection of details 1024.

As shown in FIG. 11, uplink details user interface 1050 may include an impacted clients timeline portion 1052, summary portion 1054, and details portion 1056. Impacted clients timeline portion 1052 includes a timeline, over a time period, of the number of clients connected to an uplink interface affected by poor link quality and/or poor wireless signal quality of the uplink interface over time. The timeline included in impacted clients timeline portion 1052 also graphs the wireless signal strength of the uplink interface over the time period of time. Impacted clients timeline portion 1052 therefore allows a user of the NMS to view how the wireless signal strength of the uplink interface affects the clients that connect to the uplink interface.

Summary portion 1054 may indicate a summary of the wireless signal strength of the uplink interface and correlations between poor wireless signal strength of the uplink interface and poor link quality of wireless logical paths between the uplink interface and clients. Details portion 1056 may indicate the impact of poor wireless signal strength of the uplink interface, such as the impact of the poor wireless signal strength on latency, jitter, and loss of wireless logical paths.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A network management system comprising:
a memory storing path data received from a plurality of network devices operating as network gateways for an enterprise network, the path data collected by each network device of the plurality of network devices for one or more logical paths of a physical interface from the given network device over a wide area network (WAN); and
one or more processors coupled to the memory and configured to:
determine, based at least in part on the path data, a wireless signal quality of a logical path within a specified time window and a link quality of the logical path within the specified time window;
determine that the logical path is of a poor link quality during the specified time window based at least in part on comparing a count of instances of poor link quality during the specified time window to a poor link quality threshold;
determine that the logical path is of a poor wireless quality during the specified time window based at least in part on comparing a count of instances of poor wireless quality during the specified time window to a poor wireless signal quality threshold;
in response to determining that the logical path is of the poor link quality during the specified time window, determine a correlation between the poor wireless quality of the logical path during the specified time window and the poor link quality of the logical path; and
in response to determining the correlation between the poor wireless quality of the logical path during the specified time window and the poor link quality of the logical path, output a notification that identifies the correlation between the poor wireless quality of the logical path and the poor link quality of the logical path.

2. The network management system of claim 1, wherein the path data indicates one or more of: jitter, latency, or loss for the logical path during the specified time window, and wherein to determine the link quality of the logical path within the specified time window, the one or more processors are further configured to:
determine, based at least in part on one or more of: the jitter, the latency, or the loss for the logical path during the specified time window, the link quality of the logical path within the specified time window.

3. The network management system of claim 1, wherein the path data indicates Bidirectional Forwarding Detection (BFD) data for the logical path during the specified time window, and wherein to determine the link quality of the logical path within the specified time window, the one or more processors are further configured to:
determine, based at least in part on the BFD data for the logical path during the specified time window, the link quality of the logical path within the specified time window.

4. The network management system of claim 1, wherein the path data indicates values of one or more of: a signal to noise ratio (SNR), a Reference Signal Received Power (RSRP), a Reference Signal Received Quality (RSRQ), or a Received Signal Strength Indicator (RSSI) of the logical path during the time window, and wherein to determine the wireless signal quality of the logical path within the specified time window, the one or more processors are further configured to:
determine, based at least in part on the values of one or more of: the SNR, the RSRP, the RSRQ, or the RSSI of the logical path during the time window, the wireless signal quality of the logical path within the specified time window.

5. The network management system of claim 1, wherein the one or more processors are further configured to determine the correlation between the poor wireless quality of the logical path during the specified time window and the poor link quality of the logical path in response to determining that a user impact of the poor link quality exceeds a user impact threshold.

6. The network management system of claim 1, wherein to determine the correlation between the poor wireless quality of the logical path during the specified time window and the poor link quality of the logical path, the one or more processors are further configured to:
determine a number of instances of poor link quality during the specified time window that correspond to instances of poor wireless quality during the specified time window; and
determine, based on the number of instances of poor link quality during the specified time window that correspond to the instances of poor wireless quality during the specified time window, the correlation between the poor link quality of the logical path during the specified time window and the poor wireless quality of the logical path during the specified time window.

7. The network management system of claim 1, wherein the plurality of network devices comprise two or more session-based routers configured to establish peer paths as logical paths of the physical interface between the two or more session-based routers over the WAN, and wherein the one or more processors of the network management system are configured to receive the path data collected for each peer path from software agents imbedded in the session-based routers.

8. The network management system of claim 1, wherein the plurality of network devices comprise two or more packet-based routers configured to establish tunnels as logical paths of the physical interface between the two or more packet-based routers over the WAN, and wherein the one or more processors of the network management system are configured to retrieve the path data collected for each tunnel from the packet-based routers using an application programming interface (API) or an open configuration protocol.

9. The network management system of claim 1, wherein the one or more processors are configured to invoke one or more remedial actions to address a root cause identified in the notification.

10. A method comprising:
determining, by one or more processors of a network management system and based at least in part on path data received from a plurality of network devices operating as network gateways for an enterprise network, the path data collected by each network device of the plurality of network devices for one or more logical paths of a physical interface from the given network device over a wide area network (WAN), a wireless signal quality of a logical path within a specified time window and a link quality of the logical path within the specified time window;

determining, by the one or more processors, that the logical path is of a poor link quality during the specified time window based at least in part on comparing a count of instances of poor link quality during the specified time window to a poor link quality threshold;

determining, by the one or more processors, that the logical path is of a poor wireless signal quality during the specified time window based at least in part on comparing a count of instances of poor signal quality during the specified time window to a poor wireless quality threshold;

in response to determining that the logical path is of the poor link quality during the specified time window, determining, by the one or more processors, a correlation between the poor wireless quality of the logical path during the specified time window and the poor link quality of the logical path; and in response to determining the correlation between the poor wireless quality of the logical path during the specified time window and the poor link quality of the logical path, output a notification that identifies the correlation between the poor wireless quality of the logical path and the poor link quality of the logical path.

11. The method of claim 10, wherein the path data indicates one or more of: jitter, latency, or loss for the logical path during the specified time window, and wherein determining the link quality of the logical path within the specified time window further comprises:

determining, by the one or more processors and based at least in part on one or more of: the jitter, the latency, or the loss for the logical path during the specified time window, the link quality of the logical path within the specified time window.

12. The method of claim 10, wherein the path data indicates Bidirectional Forwarding Detection (BFD) data for the logical path during the specified time window, and wherein determining the link quality of the logical path within the specified time window further comprises:

determining, by the one or more processors and based at least in part on the BFD data for the logical path during the specified time window, the link quality of the logical path within the specified time window.

13. The method of claim 10, wherein the path data indicates values of one or more of: a signal to noise ratio (SNR), a Reference Signal Received Power (RSRP), a Reference Signal Received Quality (RSRQ), or a Received Signal Strength Indicator (RSSI) of the logical path during the time window, and wherein to determine the wireless signal quality of the logical path within the specified time window, further comprising:

determining, by the one or more processors and based at least in part on the values of one or more of: the SNR, the RSRP, the RSRQ, or the RSSI of the logical path during the time window, the wireless signal quality of the logical path within the specified time window.

14. The method of claim 10, further comprising:

determining, by the one or more processors, the correlation between the poor wireless quality of the logical path during the specified time window and the poor link quality of the logical path in response to determining that a user impact of the poor link quality exceeds a user impact threshold.

15. The method of claim 10, wherein determining the correlation between the poor wireless quality of the logical path during the specified time window and the poor link quality of the logical path further comprises:

determining, by the one or more processors, a number of instances of poor link quality during the specified time window that correspond to instances of poor wireless quality during the specified time window; and determining, by the one or more processors and based on the number of instances of poor link quality during the specified time window that correspond to the instances of poor wireless quality during the specified time window, the correlation between the poor link quality of the logical path during the specified time window and the poor wireless quality of the logical path during the specified time window.

16. The method of claim 10, wherein the plurality of network devices comprise two or more session-based routers configured to establish peer paths as logical paths of the physical interface between the two or more session-based routers over the WAN, further comprising:

receiving, by the one or more processors, the path data collected for each peer path from software agents imbedded in the session-based routers.

17. The method of claim 10, wherein the plurality of network devices comprise two or more packet-based routers configured to establish tunnels as logical paths of the physical interface between the two or more packet-based routers over the WAN, further comprising:

retrieving, by the one or more processors, the path data collected for each tunnel from the packet-based routers using an application programming interface (API) or an open configuration protocol.

18. A non-transitory computer-readable storage medium comprising instructions that, when executed, cause one or more processors of a network management system to:

determine, based at least in part on path data received from a plurality of network devices operating as network gateways for an enterprise network, the path data collected by each network device of the plurality of network devices for one or more logical paths of a physical interface from the given network device over a wide area network (WAN), a wireless signal quality of a logical path within a specified time window and a link quality of the logical path within the specified time window;

determine that the logical path is of a poor link quality during the specified time window based at least in part on comparing a count of instances of poor link quality during the specified time window to a poor link quality threshold;

determine that the logical path is of a poor wireless quality during the specified time window based at least in part on comparing a count of instances of poor wireless quality during the specified time window to a poor wireless signal quality threshold;

in response to determining that the logical path is of the poor link quality during the specified time window, determine a correlation between the poor wireless quality of the logical path during the specified time window and the poor link quality of the logical path; and in response to determining the correlation between the poor wireless quality of the logical path during the specified time window and the poor link quality of the logical path, output a notification that identifies the correlation between the poor wireless quality of the logical path and the poor link quality of the logical path.

\* \* \* \* \*